United States Patent
Pan et al.

(10) Patent No.: US 11,451,788 B2
(45) Date of Patent: Sep. 20, 2022

(54) RATE CONTROL FOR LOW LATENCY VIDEO ENCODING AND TRANSMISSION

(71) Applicant: Apple Inc., Cupertino, CA (US)

(72) Inventors: Hao Pan, Sunnyvale, CA (US); Jim C. Chou, San Jose, CA (US); Felix C. Fernandes, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/252,701

(22) PCT Filed: Jun. 27, 2019

(86) PCT No.: PCT/US2019/039586
§ 371 (c)(1),
(2) Date: Dec. 15, 2020

(87) PCT Pub. No.: WO2020/006287
PCT Pub. Date: Jan. 2, 2020

(65) Prior Publication Data
US 2021/0127117 A1   Apr. 29, 2021

Related U.S. Application Data

(60) Provisional application No. 62/691,427, filed on Jun. 28, 2018.

(51) Int. Cl.
*H04N 19/146* (2014.01)
*H04L 29/06* (2006.01)
(Continued)

(52) U.S. Cl.
CPC ......... *H04N 19/146* (2014.11); *H04L 65/601* (2013.01); *H04L 65/607* (2013.01);
(Continued)

(58) Field of Classification Search
None
See application file for complete search history.

(56) References Cited

U.S. PATENT DOCUMENTS 6,640,012 B1   10/2003   Shnaider et al.
6,909,811 B1 *  6/2005   Kajiwara .............. H04N 19/46
                                                                375/E7.129
(Continued)

FOREIGN PATENT DOCUMENTS

CN   106612432   5/2017
CN   107005698   8/2017
(Continued)

OTHER PUBLICATIONS

International Search Report and Written Opinion from PCT/US2019/039586, dated Oct. 1, 2019, pp. 1-15.
(Continued)

*Primary Examiner* — Edemio Navas, Jr.
(74) *Attorney, Agent, or Firm* — Robert C. Kowert; Kowert, Hood, Munyon, Rankin & Goetzel, P.C.

(57) ABSTRACT

A video encoding system in which pixel data is decomposed into frequency bands prior to encoding. The frequency bands for a slice of a frame may be buffered so that complexity statistics may be calculated across the frequency bands prior to encoding. The statistics may then be used by a rate control component in determining quantization parameters for the frequency bands for modulating the rate in the encoder for the current slice. The quantization parameters for the frequency bands may be calculated jointly to optimize the quality of the displayed frames after decoder reconstruction and wavelet synthesis on a receiving device. Information about one or more previously processed frames may be used
(Continued)

in combination with the statistics for a current slice in determining the quantization parameters for the current slice.

20 Claims, 11 Drawing Sheets

(51) Int. Cl.
 H04N 19/14 (2014.01)
 H04N 19/169 (2014.01)
 H04N 19/176 (2014.01)
 H04N 19/63 (2014.01)
 H04L 65/60 (2022.01)

(52) U.S. Cl.
 CPC ........... *H04N 19/14* (2014.11); *H04N 19/176* (2014.11); *H04N 19/188* (2014.11); *H04N 19/63* (2014.11)

(56) References Cited

U.S. PATENT DOCUMENTS

| | | | |
|---|---|---|---|
| 6,985,158 B2 | 1/2006 | Miller et al. | |
| 7,739,714 B2 | 6/2010 | Guedalia | |
| 8,503,536 B2 | 8/2013 | Zuo et al. | |
| 9,955,176 B2 | 4/2018 | Puri | |
| 2003/0118242 A1* | 6/2003 | Nakayama | H03M 7/46 382/245 |
| 2004/0076332 A1 | 4/2004 | Lin et al. | |
| 2005/0071876 A1* | 3/2005 | van Beek | H04N 19/159 725/62 |
| 2005/0105807 A1 | 5/2005 | Suino et al. | |
| 2006/0008006 A1 | 1/2006 | Cha et al. | |
| 2006/0215766 A1* | 9/2006 | Wang | H04N 19/587 375/240.24 |
| 2008/0181522 A1 | 7/2008 | Hosaka et al. | |
| 2008/0219570 A1* | 9/2008 | Marcellin | H04N 19/17 382/233 |
| 2010/0034478 A1* | 2/2010 | Kajiwara | H04N 19/13 382/248 |
| 2014/0192862 A1* | 7/2014 | Flynn | H04N 19/117 375/240.03 |
| 2015/0156517 A1* | 6/2015 | Lu | H04N 19/126 375/240.18 |
| 2015/0215621 A1* | 7/2015 | Liu | H04N 19/124 375/240.03 |
| 2016/0227435 A1 | 8/2016 | Freeman et al. | |
| 2016/0353146 A1 | 12/2016 | Weaver et al. | |
| 2017/0227765 A1 | 8/2017 | Mammou et al. | |
| 2017/0287112 A1 | 10/2017 | Stafford et al. | |
| 2017/0301065 A1 | 10/2017 | Adsumilli et al. | |
| 2017/0339416 A1* | 11/2017 | Hendry | H04N 19/167 |
| 2018/0040164 A1 | 2/2018 | Newman et al. | |
| 2018/0097731 A1 | 4/2018 | Mutoh et al. | |

FOREIGN PATENT DOCUMENTS

| | | | |
|---|---|---|---|
| EP | 1073275 | 1/2001 | |
| EP | 1311125 | 5/2003 | |
| EP | 2270717 | 1/2011 | |
| EP | 2270717 A1 * | 1/2011 | .......... H04N 19/162 |
| JP | H09212623 | 8/1997 | |
| JP | 2003202850 | 7/2003 | |
| JP | 2005094578 | 4/2005 | |
| JP | 2006222555 | 8/2006 | |
| JP | 2007319711 | 12/2007 | |
| JP | 2008187574 | 8/2008 | |
| JP | 2009044483 | 2/2009 | |
| JP | 2010239288 | 10/2010 | |
| JP | 2016220040 | 12/2016 | |
| JP | 2018061141 | 4/2018 | |
| WO | 2005032137 | 4/2005 | |
| WO | 2020006287 | 1/2020 | |

OTHER PUBLICATIONS

Office action from Japanese Application No. 2020-570017, dated Feb. 2, 2022, pp. 1-9.

* cited by examiner

Frame

| slice 0 | Tile 0 | Tile 1 | Tile 2 | Tile 3 |
| slice 1 | Tile 0 | Tile 1 | Tile 2 | Tile 3 |
| slice 2 | Tile 0 | Tile 1 | Tile 2 | Tile 3 |
| slice 3 | Tile 0 | Tile 1 | Tile 2 | Tile 3 |

⋮

RATE CONTROL FOR LOW LATENCY VIDEO ENCODING AND TRANSMISSION

PRIORITY INFORMATION

This application is a 371 of PCT Application No. PCT/US2019/039586, filed Jun. 27, 2019, which claims benefit of priority of U.S. Provisional Application Ser. No. 62/691,427, filed Jun. 28, 2018, which are incorporated by reference herein in their entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world, or alternatively combines virtual representations of real world objects with views of a three-dimensional (3D) virtual world. The simulated environments of virtual reality and/or the mixed environments of mixed reality may thus be utilized to provide an interactive user experience for multiple applications.

SUMMARY

Various embodiments of a video encoding system are described that may encode high-resolution video sources at low latencies for transmission over a communications link (e.g., a wireless link) to a device for decoding and display. Embodiments of the video encoding system may also provide graceful degradation of encoded video transmitted to the device to maintain a desired frame rate in varying conditions such as variations in the channel capacity of the communications link. An example application of the video encoding system is in virtual or mixed reality systems in which video frames containing virtual content are rendered, encoded, and transmitted by a base station to a device (e.g., a notebook or laptop computer, pad or tablet device, smartphone, or head-mounted display (HMD) such as a headset, helmet, goggles, or glasses that may be worn by a user) for decoding and display.

In some embodiments, the video encoding system may perform a wavelet transform on the pixel data prior to encoding to decompose the pixel data into frequency bands. The frequency bands are then organized into blocks that are provided to a block-based encoder for encoding/compression. The encoded frequency data is then sent to a wireless interface that packetizes the encoded frequency data and transmits the packets to the receiving device. On the receiving device, the encoded data is de-packetized and passed through a block-based decoder to recover the frequency bands. Wavelet synthesis is then performed on the recovered frequency bands to reconstruct the pixel data for display.

Various methods and apparatus may be implemented by the video encoding system to maintain the target frame rate through the wireless link and to minimize the latency in frame rendering, transmittal, and display and to provide graceful degradation of encoded video transmitted to the device to maintain a desired frame rate in varying conditions such as variations in the channel capacity of the wireless connection.

A target of a system that implements an embodiment of the video encoding system may be to provide very low latency (e.g., 4-5 milliseconds) between the time the virtual content is rendered on the base station and the time the virtual content is displayed on the device while minimizing errors (e.g., dropped packets) and maximizing bandwidth usage over the wireless connection. Embodiments of the video encoding system may implement a rate control method to help achieve the targeted low latency for the system when encoding data to be transmitted over the wireless connection to the device.

In some embodiments, the video encoding system includes a wavelet transform component that performs a 2-layer wavelet decomposition that decomposes blocks of pixels from a slice of a frame into multiple different frequency bands, followed by a block-based encoder such as HEVC that encodes the frequency bands. In some embodiments, to perform rate control under the strict latency requirements of the VR/MR system, instead of working over a time constant of a frame or two frames to adjust encoder parameters, a rate control component may adjust encoder parameters (e.g., quantization parameters for the frequency bands) for each slice. In some embodiments, the frequency bands for a slice may be buffered in local memory after the wavelet transform so that complexity statistics may be calculated across the frequency bands prior to encoding, for example by a complexity analysis component of the video encoding system. In some embodiments, the complexity statistics may include one or more of, but are not limited to, pixel gradient and variance of size for the CTU blocks. The complexity statistics may then be used by a rate control component in determining quantization parameters for the frequency bands for modulating the rate in the encoder for the current slice. Calculating the complexity statistics on the buffered frequency bands allows the video encoding system to estimate the amount of complexity in a slice before encoding the slice.

In some embodiments, the rate control component may examine statistics for one or more previously processed frames to determine an actual number of bits that were used to encode co-sited blocks or slices of the frame(s). This information may then be used in combination with the complexity statistics for a current slice in determining the quantization parameters for the current slice.

In some embodiments, the quantization parameters for the frequency bands may be calculated jointly to optimize the overall displayed quality of the frames after decoder reconstruction and wavelet synthesis is performed on the device. A method for rate allocation between the frequency bands is to find an operating point in each of the frequency bands that results in equal slopes on the operational rate distortion curve. In some embodiments the operational rate distortion curve may be estimated using a combination of statistics from the entropy coding stage of the encoder pipeline with the fact that the rate of the coefficients can be well approximated for quantization parameter steps of 6.

In some embodiments, there may be an area of interest within an image (e.g., the foveated region) that should have higher resolution than the surrounding region (e.g., the peripheral region) in the same image. In some embodiments, complexity statistics from a previous frame along with the foveated region from the previous frame may be stored and used in calculating the quantization parameters for the frequency bands in slices of a current frame. As an example, for each block that is to be encoded, the foveated region of a previous frame may be used to modulate the complexity statistics that were calculated for the previous frame. The resulting complexity statistics may then be used in addition to the complexity statistics calculated for slices of a current frame in determining the quantization parameters.

In some embodiments, the rate control component may adjust encoder parameters (e.g., quantization parameters for the frequency bands or priority levels) at the block level rather than at the slice level. In some embodiments, complexity statistics may be calculated for each block of a slice, and quantization parameters may be determined for the blocks.

Figure 1:
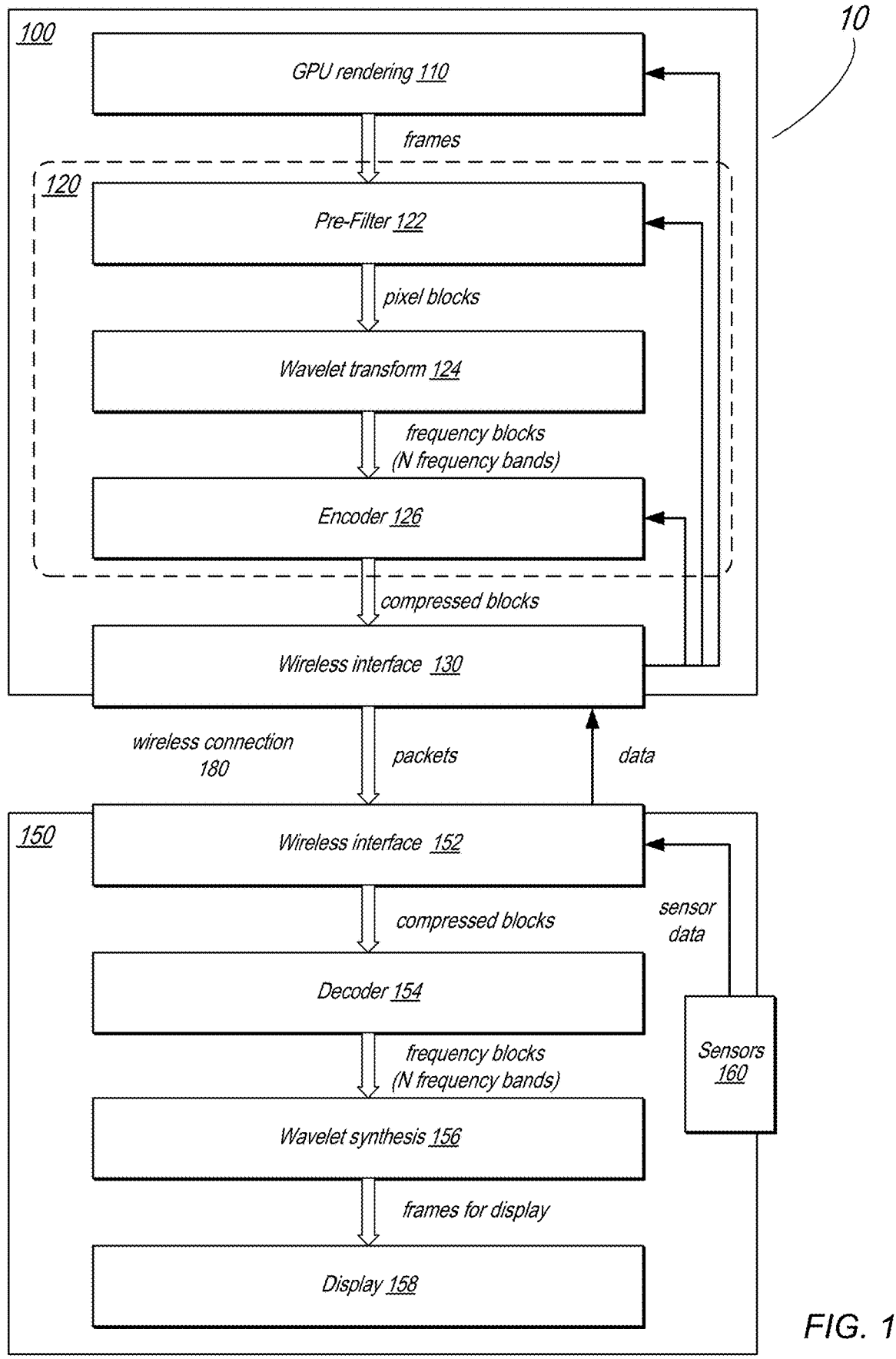
FIG. 1 is a block diagram illustrating a video encoding system that decomposes pixel data into frequency bands using a wavelet transform prior to encoding, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of a video encoding system are described. Embodiments of the video encoding system may encode high-resolution video sources at low latencies for transmission over a communications link (e.g., a wireless link) to a device for decoding and display. Embodiments of the video encoding system may also provide graceful degradation of encoded video transmitted to the device to maintain a desired frame rate in varying conditions such as variations in the channel capacity of the communications link.

An example application of the video encoding system is in virtual or mixed reality systems in which video frames containing virtual content are rendered, encoded, and transmitted to a device for decoding and display. Embodiments of a virtual or mixed reality system (referred to herein as a VR/MR system) are described in which embodiments of the video encoding system may be implemented. In some embodiments, the VR/MR system may include a device (e.g., a pad or tablet device, a smartphone, or a headset, helmet, goggles, or glasses worn by the user, referred to herein as a head-mounted display (HMD)), and a separate computing device, referred to herein as a base station. In some embodiments, the device and base station may each include wireless communications technology that allows the device and base station to communicate and exchange data via a wireless connection. In some embodiments, the device may include sensors that collect information about the user's environment (e.g., video, depth information, lighting information, etc.) and information about the user (e.g., the user's expressions, eye movement, hand gestures, etc.). The information collected by the sensors may be transmitted to the base station via the wireless connection. The base station may include software and hardware (e.g., processors (system on a chip (SOC), CPUs, image signal processors (ISPs), graphics processing units (GPUs), encoder/decoders (codecs), etc.), memory, etc.) configured to generate and render frames that include virtual content based at least in part on the sensor information received from the device via the wireless connection. The base station may also include an embodiment of the video encoding system as described herein that may pre-filter, compress and transmit the rendered frames to the device for display via the wireless connection.

In some embodiments, the VR/MR system may implement a proprietary wireless communications technology that provides a highly directional wireless link between the device and the base station. In some embodiments, the directionality and bandwidth of the wireless communication technology may support multiple devices communicating with the base station at the same time to thus enable multiple users to use the system at the same time in a co-located environment. However, other commercial (e.g., Wi-Fi, Bluetooth, etc.) or proprietary wireless communications technologies may be supported in some embodiments.

Primary constraints to be considered on a wireless link include bandwidth and latency. A target of the VR/MR system is to provide a high resolution, wide field of view (FOV) virtual display at a frame rate to provide the user with a high-quality VR/MR view. Another target is to minimize latency between the time a frame is rendered by the base station and the time the frame is displayed by the device. However, the channel capacity of the wireless link may vary with time, and the wireless link may thus support only a certain amount of information to be transmitted at any given time.

Various methods and apparatus are described herein that may be implemented by the video encoding system to maintain the target frame rate through the wireless link and to minimize the latency in frame rendering, transmittal, and display. In addition, the methods and apparatus may provide graceful degradation of encoded video transmitted to the device to maintain a desired frame rate in varying conditions such as variations in the channel capacity of the communications link.

In some embodiments, the video encoding system may perform a wavelet transform on the pixel data prior to encoding to decompose the pixel data into frequency bands. The frequency bands are then organized into blocks that are provided to a block-based encoder for encoding/compression. As an example, a frame may be divided into 128×128 blocks, and a two-level wavelet decomposition may be applied to each 128×128 block to generate 16 32×32 blocks of frequency data representing seven frequency bands that may then be sent to an encoder (e.g., a High Efficiency Video Coding (HEVC) encoder) to be encoded. The encoded frequency data is then sent to a wireless interface that packetizes the encoded frequency data and transmits the packets to the receiving device (e.g., an HMD, pad or tablet device, smartphone, etc.). On the receiving device, the encoded data is de-packetized and passed through a block-based decoder to recover the frequency bands. Wavelet synthesis is then performed on the recovered frequency bands to reconstruct the pixel data for display.

While embodiments are generally described in which the wavelet transform is a two-level wavelet decomposition applied to each pixel block from a video frame, in various embodiments the wavelet decomposition may be any number of levels (e.g., one level, two levels, three levels, four levels, etc.), and may be adjusted to trade-off quality of the encoded image vs. complexity of the blocks to be encoded.

In some embodiments, the video encoding system may perform slice-based rendering, encoding, and transmittal. Rendering, encoding, and transmitting entire frames may have a latency and memory impact as each frame needs to be completed, stored, and then transmitted to the next stage of the VR/MR system. In slice-based rendering, rather than rendering and encoding entire frames in the base station and transmitting the rendered frames to the device, the base station may render and encode parts of frames (referred to as slices) and transmit the encoded slices to the device as they are ready. A slice may, for example, be a row of 128×128 blocks, or two or more rows of blocks. Slice-based rendering and encoding may help to reduce latency, and may also reduce the amount of memory needed for buffering, which may reduce the memory footprint on the chip(s) or processor(s) as well as power requirements.

In some embodiments, the video encoding system may perform tile-based rendering, encoding, and transmittal. In tile-based rendering, encoding, and transmittal, each slice may be divided into multiple tiles (e.g., four tiles), and the base station may render and encode the tiles and transmit the encoded tiles to the device as they are ready.

In some embodiments, the video encoding system may perform tile-based encoding using a single encoder to process tiles from each slice. However, in some embodiments, the video encoding system may perform tile-based encoding using multiple encoders to process respective tiles from each slice. For example, in some embodiments, each slice may be divided into four tiles, each tile including multiple 128×128 blocks, and two encoders (e0 and e1) may operate on two tiles from each slice (e.g., e0 operates on t0 and t1; e1 operates on t2 and t3). Each encoder may multiplex the processing of blocks from different frequency bands between its two tiles to allow for 16 time units between the processing of blocks from the same frequency band. By multiplexing the processing of blocks between two tiles, dependencies between blocks in a frequency band may be handled appropriately. While embodiments are described in which each slice is divided into four tiles and two encoders operate on respective tiles from each slice, slices may be divided into more tiles (e.g., six or eight tiles) in some embodiments, and more encoders (e.g., three or four encoders) may be used in some embodiments.

In some embodiments, the video encoding system may perform pre-filtering of the pixel data in frames prior to the wavelet transform. Pre-filtering may, for example, reduce the resolution of the frames rendered by the base station prior to performing the wavelet transform, encoding, and transmission of the frames to the device over the wireless link, which may help in improving compression, and may reduce latency and bandwidth usage on the wireless link.

In some embodiments in which the device is an HMD, pre-filtering may include performing a lens warp on the frames on the base station prior to the wavelet transform. The lens warp is performed to correct for the distortion of the images introduced by the lenses on the HMD that the images are viewed through, thus improving quality of the images. In some embodiments, the HMD may store lens warp data for the lenses, for example generated by a calibration process, and may provide the lens warp data to the base station over the wireless connection. The base station may then perform the lens warp on the frames based on the lens warp data for that HMD. In conventional VR/MR systems, the lens warp is performed on the HMD after decoding and prior to display. Performing the lens warp on the base station in the pre-filter stage may reduce the resolution of the frames prior to performing the wavelet transform and encoding, which may help in improving compression, and may reduce latency and bandwidth usage on the wireless link. In addition, by performing the lens warp on the base station in the pre-filter stage rather than on the HMD after decoding, filtering of the image data may only need to be performed once, as opposed to performing filtering on the base station to reduce resolution prior to encoding and then performing lens warp filtering on the HMD.

In some embodiments, pre-filtering may include filtering to reduce resolution in peripheral regions while maintaining higher resolution in foveated regions. In this method, gaze tracking information obtained from the device may be used to identify the direction in which the user is currently looking. Human eyes can perceive higher resolution in the foveal region than in the peripheral region. Thus, a region of the frame that corresponds to the fovea (referred to as the foveated region) may be identified based at least in part on the determined gaze direction. In some embodiments, the peripheral region (i.e. the portion of the frame outside the foveated region) may be pre-filtered to reduce information based on knowledge of the human vision system, for example by filtering high frequency information and/or increasing color compression. In some embodiments, the amount of filtering applied to the peripheral region may increase extending towards the periphery of the frame. Pre-filtering of the peripheral region may help to provide improved compression of the frame.

FIG. 1 is a block diagram illustrating a video encoding system 120 that decomposes pixel data into frequency bands using a wavelet transform prior to encoding, according to at least some embodiments. A VR/MR system 10 may include at least one device 150 (e.g., a pad or tablet device, a smartphone, or an HMD such as a headset, helmet, goggles, or glasses that may be worn by a user) and a computing device 100 (referred to herein as a base station). The base station 100 renders VR or MR frames including virtual content, encodes the frames, and transmits the encoded frames over a wireless connection 180 to the device 150 for decoding and display by the device 150.

In some embodiments, the device 150 may include sensors 160 that collect information about the user 190's environment (e.g., video, depth information, lighting information, etc.) and about the user 190 (e.g., the user's expressions, eye movement, gaze direction, hand gestures, etc.). The device 150 may transmit at least some of the information collected by sensors 160 to the base station 100 via wireless connection 180. The base station 100 may render frames for display by the device 150 that include virtual content based at least in part on the various information obtained from the sensors 160, encode the frames, and transmit the encoded frames to the device 150 for decoding and display to the user via the wireless connection 180.

The base station 100 and device 150 may implement wireless communications technology that allows the base station 100 and device 150 to communicate and exchange data via a wireless connection 180. In some embodiments, the wireless connection 180 may be implemented according to a proprietary wireless communications technology that provides a highly directional wireless link between the device 150 and the base station 100. However, other commercial (e.g., Wi-Fi, Bluetooth, etc.) or proprietary wireless communications technologies may be used in some embodiments.

Primary constraints to be considered on the wireless connection 180 between the device 150 and the base station 100 in a VR/MR system 10 include bandwidth and latency. For example, in some embodiments, a target is to provide a high resolution, wide field of view (FOV) virtual display to the user at a frame rate that provides the user with a high-quality VR/MR view. Another target is to minimize latency between the time a video frame is captured by the device and the time a rendered VR/MR frame based on the video frame is displayed by the device.

The base station 100 may include various hardware components for rendering, filtering, encoding, and transmitting video and/or images as described herein, for example various types of processors, integrated circuits (ICs), central processing units (CPUs), graphics processing units (GPUs), image signal processors (ISPs), encoder/decoders (codecs), etc. The base station 100 may include, but is not limited to, a GPU rendering 110 component, a wireless interface 130 component, and a video encoding system 120 that may include one or more hardware components that implement various methods that may help to maintain the target frame rate through the wireless connection 180 and to minimize the latency in frame rendering, encoding, transmittal, and display. The video encoding system 120 may include, but is not limited to, a pre-filter 122 component (e.g., an N-channel filter bank), a wavelet transform 124 component, and an encoder 126 component.

GPU rendering 110 may include one or more hardware components that may render frames for display by the device 150 that include virtual content based at least in part on the various information obtained from the sensors 160.

In some embodiments, the video encoding system 120 may include one or more hardware components that pre-filter 122 the pixel data in the rendered frames prior to performing a wavelet transform 124. Pre-filter 122 may, for example, reduce the resolution of the frames rendered on the base station 100 prior to performing the wavelet transform 124, encoding 126, and transmission to the device 150 over the wireless connection 180, which may help in improving compression, and may reduce latency and bandwidth usage on the wireless connection 180.

In some embodiments, pre-filter 122 may perform a lens warp on the frames on the base station 100 prior to the wavelet transform 124. The lens warp is performed to correct for the distortion of the images introduced by the lenses on the device that the images are viewed through, thus improving quality of the images. In some embodiments, the device 150 may store lens warp data for the lenses, for example generated by a calibration process, and may provide the lens warp data to the base station 100 over the wireless connection 180. The pre-filter 122 component of the video encoding system 120 may then perform the lens warp on the frames based on the lens warp data for that device 150. In conventional VR/MR systems, the lens warp is performed on the device 150 after decoding and prior to display. Performing the lens warp on the base station 100 in the pre-filter 122 stage may reduce the resolution of the frames prior to performing the wavelet transform 124 and encoding 126, which may help in improving compression, and may reduce latency and bandwidth usage on the wireless connection 180. In addition, by performing the lens warp on the base station 100 in the pre-filter 122 stage rather than on the device 150 after decoding, filtering of the image data may only need to be performed once, as opposed to performing filtering on the base station 100 to reduce resolution prior to encoding 126 and then performing lens warp filtering on the device 150.

In some embodiments, pre-filter 122 may also apply one or more filters to reduce resolution in peripheral regions while maintaining higher resolution in foveated regions. In this method, gaze tracking information obtained from the device 150 may be used to identify the direction in which the user is currently looking. Human eyes can perceive higher resolution in the foveal region than in the peripheral region. Thus, a region of the frame that corresponds to the fovea (referred to as the foveated region) may be identified based at least in part on the determined gaze direction. In some embodiments, the peripheral region (i.e. the portion of the frame outside the foveated region) may be pre-filtered to reduce information based on knowledge of the human vision system, for example by filtering high frequency information and/or increasing color compression. In some embodiments, the amount of filtering applied to the peripheral region may increase extending towards the periphery of the frame. Pre-filtering of the peripheral region may help to provide improved compression of the frame.

Figures 3A, 3B:
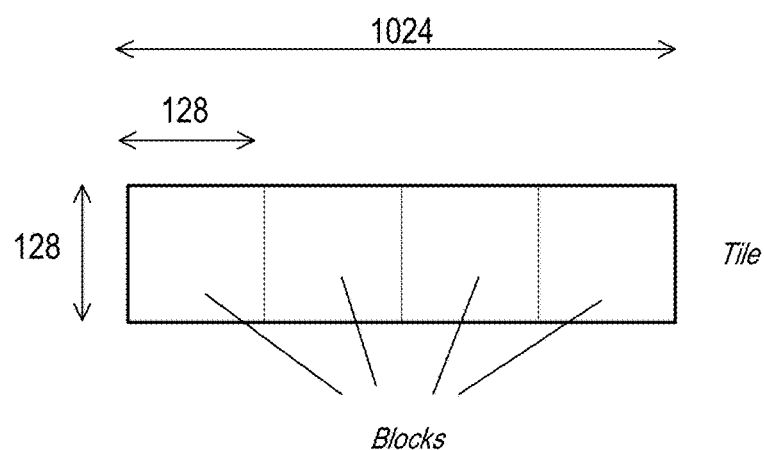
FIG. 3A illustrates an example frame divided into slices and tiles, according to at least some embodiments.
FIG. 3B illustrates an example tile divided into blocks, according to at least some embodiments.
Figure 3C:
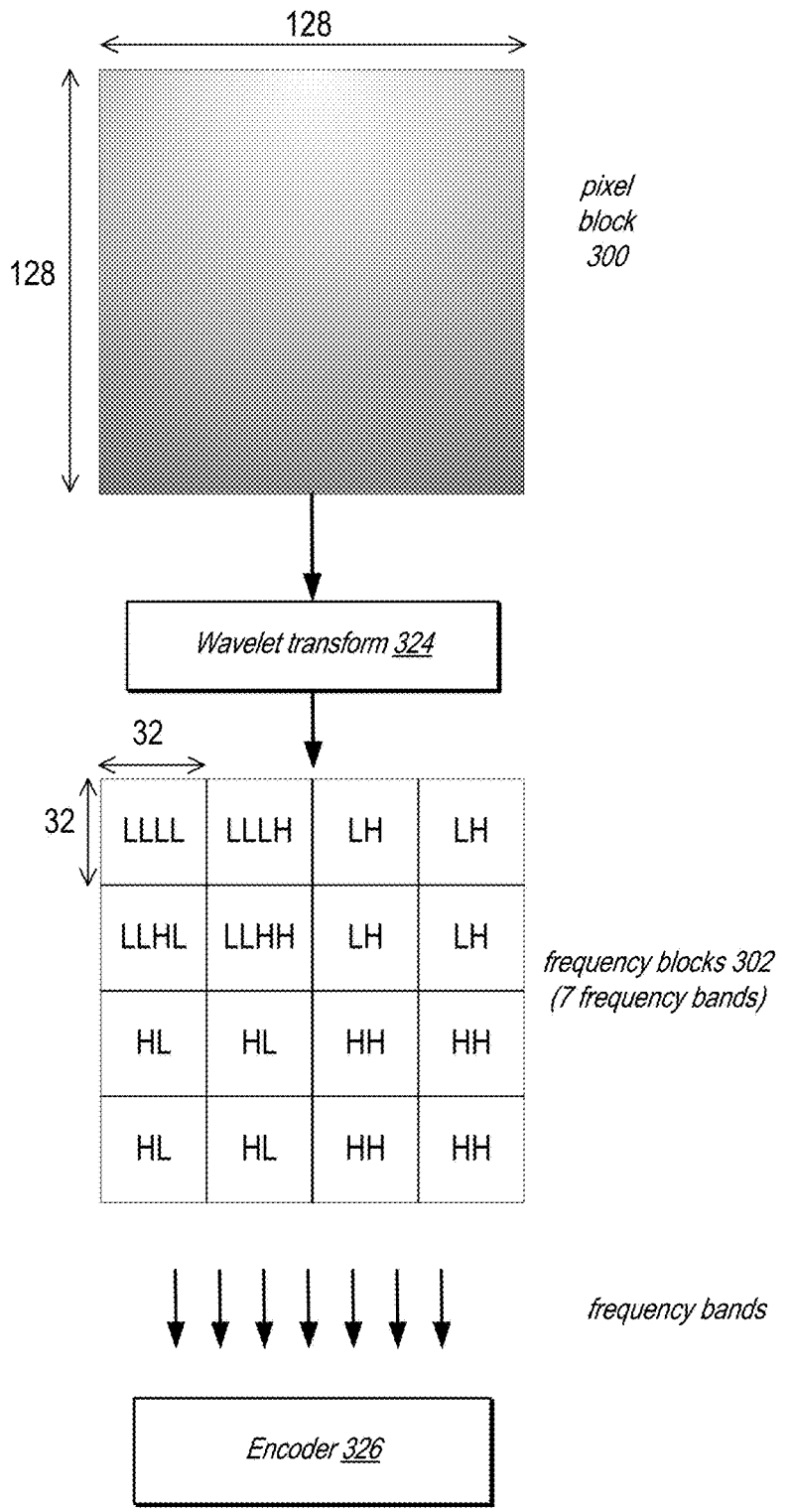
FIG. 3C illustrates performing a wavelet transform of a pixel block that stores pixel data to generate frequency band data prior to encoding, according to at least some embodiments.

In some embodiments, a wavelet transform 124 component of the video encoding system 120 may include one or more hardware components (e.g., an N-channel filter bank) that perform a wavelet transform on the pixel data prior to encoding to decompose the pixel data into frequency bands. The frequency bands are then organized into blocks that are provided to a block-based encoder 126 for encoding/compression. As an example, as illustrated in FIGS. 3A through 3C, a frame may be divided into 128×128 blocks, and a two-level wavelet decomposition may be applied to each 128×128 block to generate 16 32×32 blocks of frequency data representing seven frequency bands that may then be sent to a block-based encoder (e.g., a High Efficiency Video Coding (HEVC) encoder) 126 to be encoded. The encoded frequency data is then sent to a wireless interface 130, implemented by one or more hardware components, that packetizes the data and transmits the packets to the device 150 over a wireless connection 180.

The device 150 may include various hardware components for decoding and displaying video and/or images as described herein, for example various types of processors, integrated circuits (ICs), central processing units (CPUs), graphics processing units (GPUs), image signal processors (ISPs), encoder/decoders (codecs), etc. The device 150 may include, but is not limited to, a wireless interface 152, a decoder 154 component (e.g., High Efficiency Video Coding (HEVC) decoder), a wavelet synthesis 156 component, and a display 158 component. On the device 150, the wireless interface 152 receives the packets that were transmitted over the wireless connection 180 by the base station 100. The encoded data is de-packetized and passed through a block-based decoder 154 (e.g., a High Efficiency Video Coding (HEVC) decoder) to recover the frequency bands. Wavelet synthesis 156 is then performed on the recovered frequency data to reconstruct the pixel data for display 158.

In some embodiments, the video encoding system 120 may perform slice-based rendering, encoding, and transmittal. Rendering, encoding, and transmitting entire frames may have a latency and memory impact as each frame needs to be completed, stored, and then transmitted to the next stage of the VR/MR system 10. In slice-based rendering, rather than rendering and encoding entire frames in the base station 100 and transmitting the rendered frames to the device 150, the base station 100 may render and encode parts of frames (referred to as slices) and transmit the encoded slices to the device 150 as they are ready. A slice may, for example, be a row of 128×128 blocks. Slice-based rendering and encoding may help to reduce latency, and may also reduce the amount of memory needed for buffering, which reduces the memory footprint on the chip(s) or processor(s) as well as power requirements.

In some embodiments, the video encoding system 120 may perform tile-based rendering, encoding, and transmittal. In tile-based rendering, encoding, and transmittal, each slice may be divided into multiple tiles (e.g., four tiles), and the base station 100 may render and encode the tiles and transmit the encoded tiles to the device 150 as they are ready.

Figure 2:
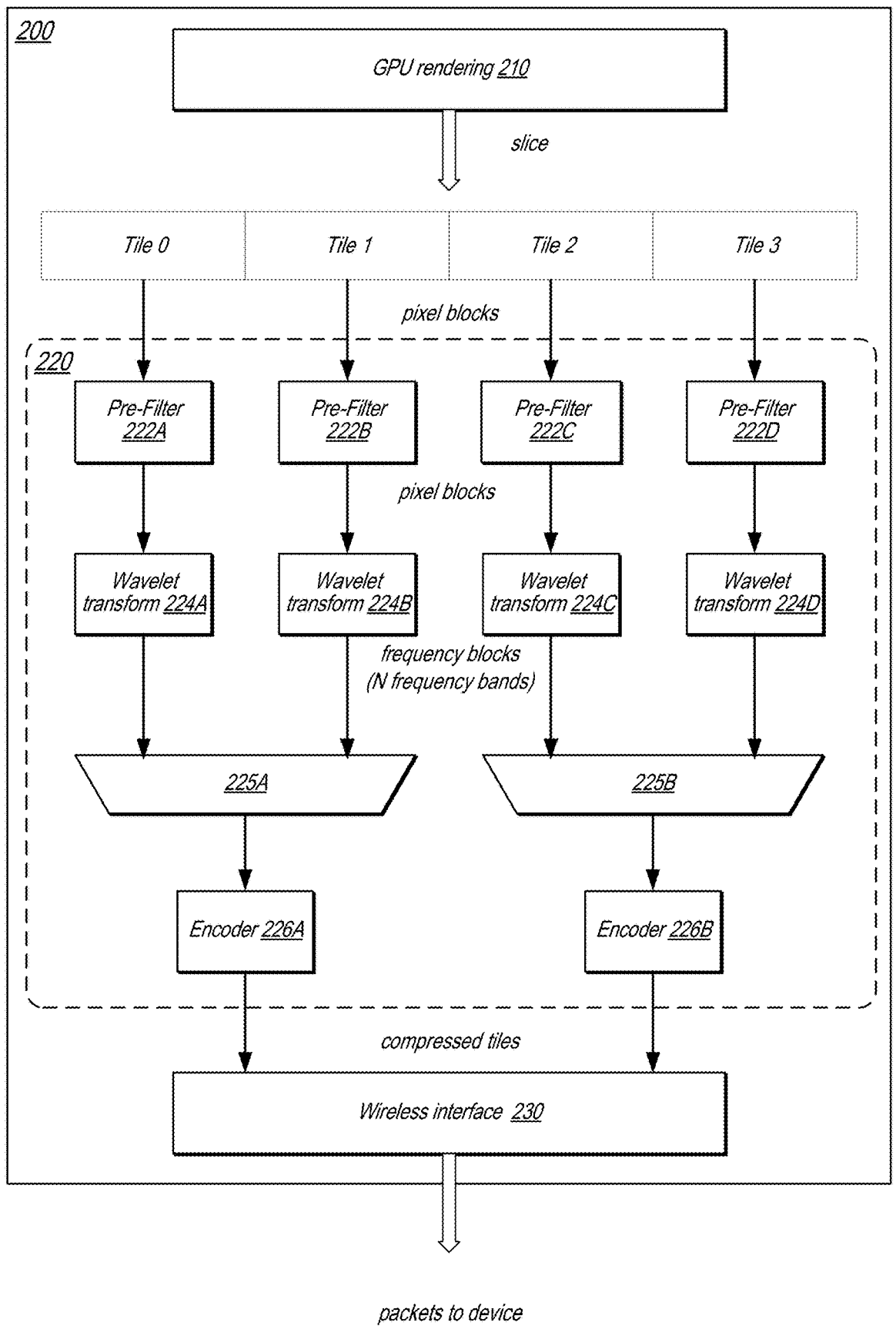
FIG. 2 illustrates a video encoding system that includes multiple encoders that process tiles from frames in parallel, according to at least some embodiments.

In some embodiments, the video encoding system 120 may perform tile-based rendering, encoding, and transmittal using a single encoder 126 to process tiles from each slice. However, in some embodiments, the video encoding system 120 may perform tile-based encoding using multiple encoders 126 to process respective tiles from each slice. FIG. 2 illustrates a video encoding system 220 that includes multiple encoders (two encoders 226A and 226B, in this example) that process tiles from rendered frames in parallel, according to at least some embodiments.

A GPU rendering 210 component of the base station 200 may include one or more GPUs and/or other components that render frames (or slices of frames) for display. A frame may be divided into slices, for example as illustrated in FIG. 3A. As illustrated in FIG. 3A, each slice may be divided into multiple tiles (four, in this example), each tile including multiple blocks. FIG. 3B illustrates an example tile that includes four 128×128 blocks. However, blocks of other sizes (e.g. 64×64, 32×32, etc.) may be used in some embodiments, and a tile may include more or fewer blocks.

Pre-filter 222 and wavelet transform 224 components of the video encoding system 220 may then process each tile prior to encoding 226. In some embodiments, video encoding system 220 may include a separate pre-filter 222 component and wavelet transform 224 component for processing each tile. In this example, pre-filter 222A component and wavelet transform 224A component process tile 0, pre-filter 222B component and wavelet transform 224B component process tile 1, pre-filter 222C component and wavelet transform 224C component process tile 2, and pre-filter 222D component and wavelet transform 224D component process tile 3. The pre-filter 222 components perform pre-filtering of the tiles as described herein, and the wavelet transform 224 components decompose the tiles into frequency bands as described herein. However, in some embodiments, video encoding system 220 may include a single pre-filter 222 component and a single wavelet transform 224 component that process the tiles. In some embodiments, video encoding system 220 may include multiple (e.g., 2) pre-filter 222 components and multiple (e.g., 2) wavelet transform 224 components that each process multiple (e.g., 2) tiles.

Two encoders 226A and 226B may operate on two tiles from each slice (e.g., encoder 226A operates on tile 0 and tile 1; encoder 226B operates on tile 2 and tile 3). Each encoder 226 may multiplex the processing of blocks from different frequency bands (i.e., the 16 32×32 blocks illustrated in FIG. 3C) between its two tiles to allow for 16 time units between the processing of blocks from the same frequency band. By multiplexing the processing of blocks between two tiles, dependencies between blocks in the same frequency band may be handled appropriately.

While embodiments are described in which each slice is divided into four tiles and two encoders operate on respective tiles from each slice, slices may be divided into more tiles (e.g., six or eight tiles) in some embodiments, and more encoders (e.g., three, four, or more encoders) may be used in some embodiments.

FIG. 3C illustrates performing a wavelet transform of a pixel block that stores pixel data to generate frequency band data prior to encoding, according to at least some embodiments. In this example, a two-level wavelet decomposition is applied by the wavelet transform 324 component to a 128×128 pixel block 300 to generate sixteen 32×32 blocks 302 of frequency data representing seven frequency bands. The frequency blocks 302 are then provided to an encoder 326 for encoding. For example, the frequency blocks 302 may be written to a buffer by the wavelet transform 324 component, and read from the buffer by the encoder 326 component.

In the labels of the frequency blocks 302, the letter L represents a low pass filter, and the letter H represents a high pass filter. The blocks 302 labeled with two letters represent a one-level (2D) wavelet transform or decomposition. In the blocks 302 labeled with two letters (representing three of the seven frequency bands LH, HL, and HH), the first letter represents a vertical filter (either high or low) performed first, and the second letter represents a horizontal filter (either high or low) performed second. The blocks 302 labeled with four letters represent a two-level wavelet transform or decomposition. In the blocks 302 labeled with four letters, the first two letters (LL) indicate that there was first a vertical low pass filter followed by a horizontal low pass filter; the second two letters indicate that the resulting LL block was then filtered four ways, LL, LH, HL, and HH (thus generating four of the seven frequency bands (LLLL, LLLH, LLHL, and LLHH).

Decomposing the pixel data into frequency bands as illustrated in FIG. 3C allows the frequency bands to be buffered and processed as separate streams by the encoder 326. Processing the frequency bands as separate streams allows the encoder 326 component to multiplex the processing of the independent streams. In block-based encoding methods such as HEVC encoding, blocks (referred to as coding tree units (CTUs)) are processed in a block processing pipeline at multiple stages; two or more blocks may be at different stages of the pipeline at a given clock cycle, and the blocks move through the pipeline as the clock cycles. The processing of a given block may have dependencies on one or more previously processed neighbor blocks, for example one or more blocks in the row above the given block and/or the block to the left of the given block. By multiplexing the processing of the streams of frequency band data, the encoder 326 spaces out the processing of the blocks in a given stream, thus providing additional clock cycles to process a neighbor block on which a given block has dependencies. For example, the block to the left of the given block may be several stages ahead of the given block in the pipeline when the given block reaches a stage that depends on the previously processed neighbor block. This allows the encoder 326 to better handle dependencies on previously processed blocks, and reduces or eliminates the need to wait for completion of processing of a neighbor block in the pipeline before processing the given block at a stage that depends on the neighbor block.

In addition, decomposing the pixel data into frequency bands as illustrated in FIG. 3C allows the frequency bands to be prioritized by the encoder 326 and the wireless interface. Typically, in image and video transmission, the lower frequencies are more important, while the higher frequencies are less important. Higher frequencies usually correspond to details in the image, and thus can be considered as lower priority. The higher frequency bands contain a smaller percentage of the energy in the image. Most of the energy is contained in the lower frequency bands. Decomposing the pixel data into frequency bands thus provides a priority ordering to the data stream that can be leveraged by the encoder 326 and the wireless interface when encoding and transmitting the data stream. For example, in some embodiments, different compression techniques may be used on the different frequency bands, with more aggressive compression applied to the lower priority bands, and more conservative compression applied to the higher priority bands. As another example, the priority ordering of the frequency bands may help in providing graceful degradation of the VR/MR system. Performance of the wireless connection can be monitored, and feedback from the device may be considered, to track performance of the overall system. If the system is falling behind for some reason, for example if the wireless connection degrades and bandwidth capacity of the wireless connection drops below a threshold, the encoder 326 and wireless interface may prioritize the encoding and transmission of one or more of the lower frequency bands, and may reduce or drop the encoding and/or transmission of one or more of the frequency levels that have been assigned a lower priority level, for example one or more of the higher frequency bands.

As described above, the wavelet transform decomposes an image into frequency bands. In some embodiments, this may be leveraged to send the same signal to displays of varying resolution. As an example, suppose that a two-level wavelet decomposition is applied to decompose the signal into seven bands. If four of the bands are sent (LLLL, LLLH, LLHL and LLHH), the bands may be reconstructed to the original intended resolution at less visual quality. As an alternative, the bands may also be reconstructed at ¼th resolution (½ in each dimension) which may be suitable for a display panel with smaller display resolution.

Figure 4:
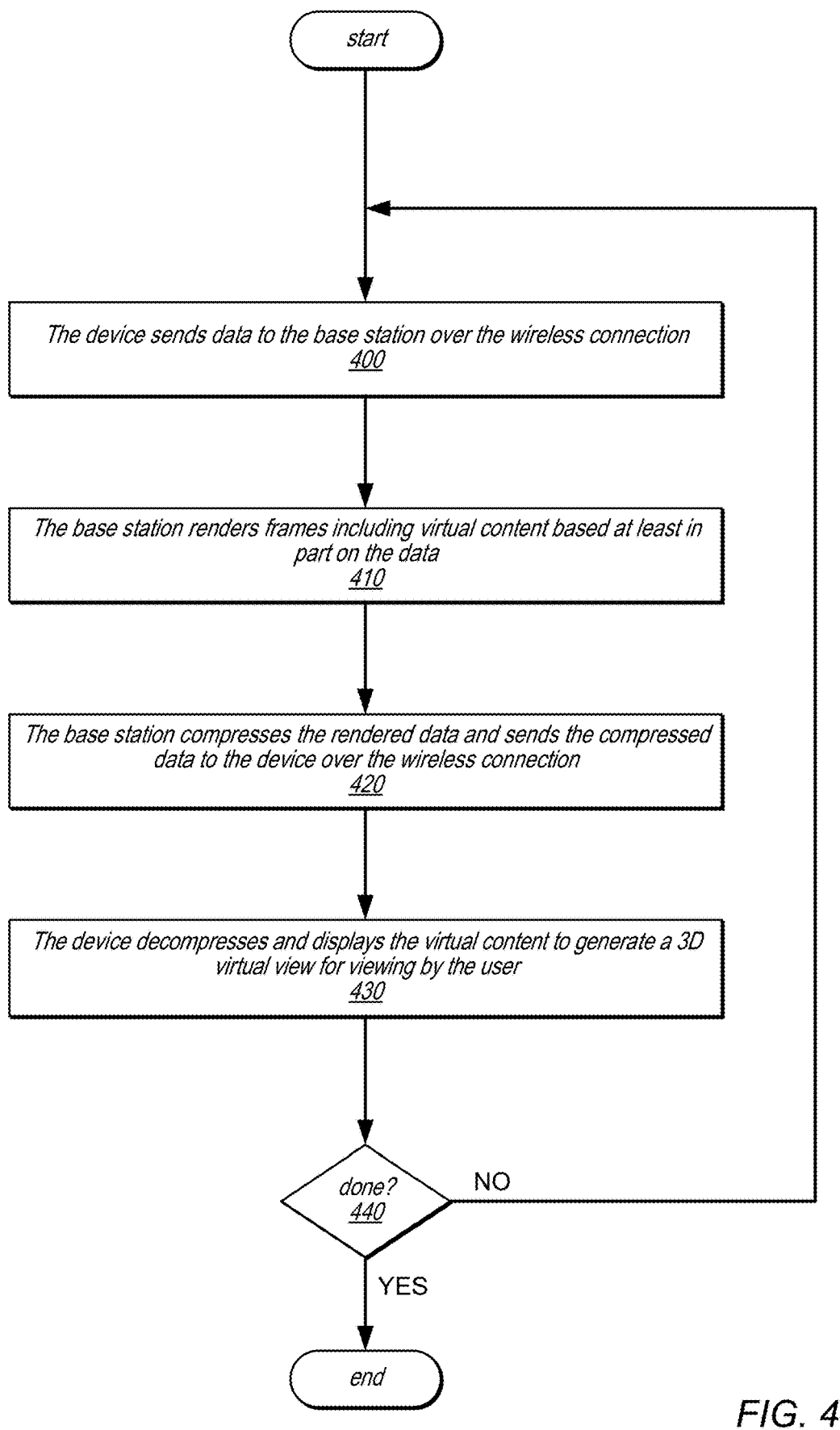
FIG. 4 is a high-level flowchart of a method of operation for VR/MR systems that include video encoding systems as illustrated in FIGS. 1 and 2, according to at least some embodiments.

FIG. 4 is a high-level flowchart of a method of operation for VR/MR systems that include video encoding systems as illustrated in FIGS. 1 and 2, according to at least some embodiments. As indicated at 400, the device sends data to the base station over the wireless connection. As indicated at 410, the base station renders frames including virtual content based at least in part on the device data. As indicated at 420, the base station compresses the rendered data and sends the compressed data to the device over the wireless connection. As indicated at 430, the device decompresses and displays the virtual content to generate a 3D virtual view for viewing by the user. As indicated by the arrow returning from 430 to 400, the method continues as long as the user is using the VR/MR system.

In some embodiments, rather than rendering and encoding entire frames in the base station and transmitting the rendered frames to the device, the base station may render and encode parts of frames (referred to as slices) and transmit the encoded slices to the device as they are ready. A slice may, for example, be a row of 128×128 blocks. In some embodiments, the video encoding system may perform tile-based rendering, encoding, and transmittal. In tile-based rendering, encoding, and transmittal, each slice may be divided into multiple tiles each including one or more blocks (e.g., four tiles, each including four blocks), and the base station may render and encode the tiles and transmit the encoded tiles to the device as they are ready.

Figure 5:
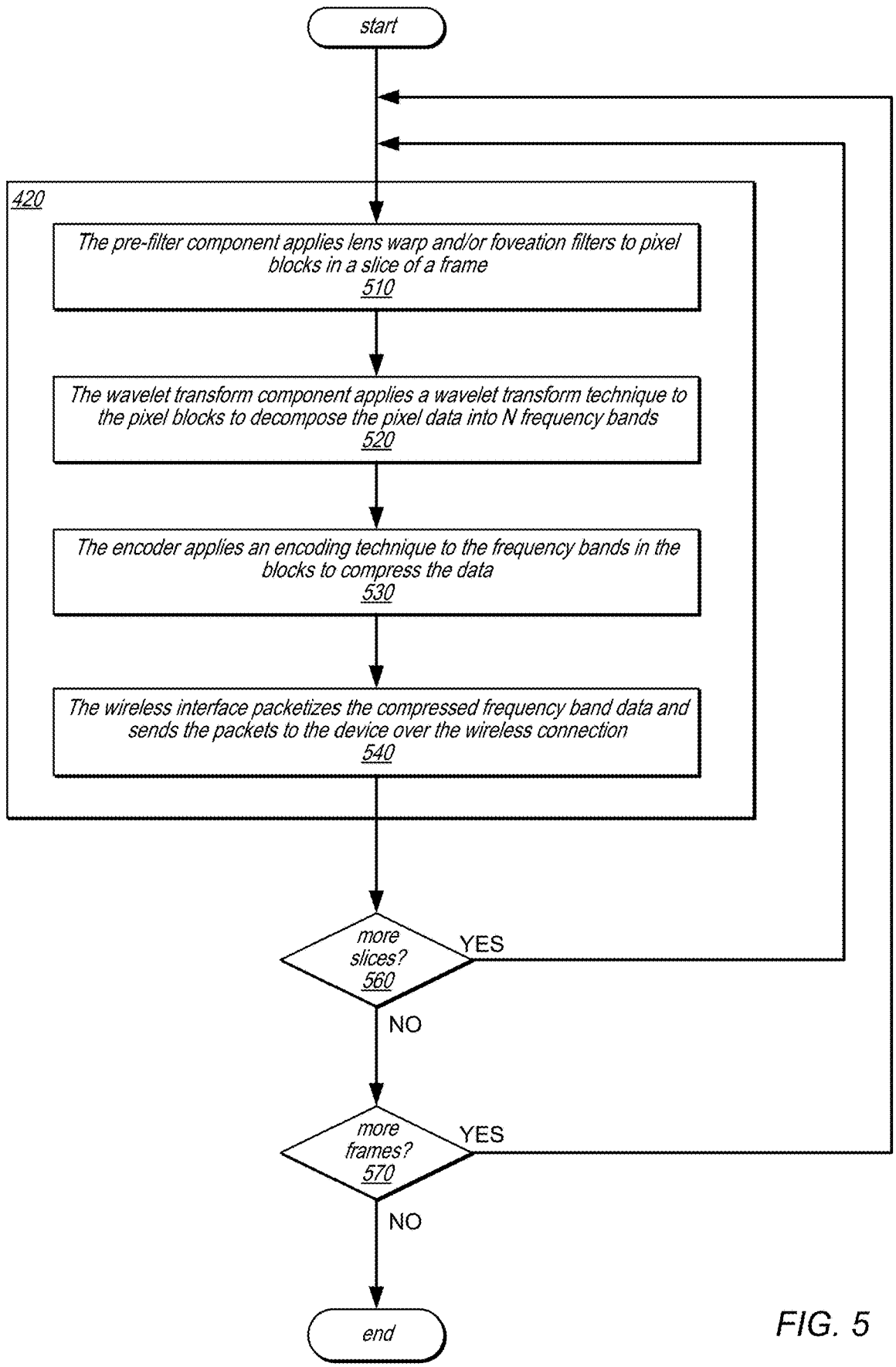
FIG. 5 is a flowchart of a method of operation for a video encoding system as illustrated in FIG. 1, according to at least some embodiments.

FIG. 5 is a flowchart of a method of operation for a video encoding system as illustrated in FIG. 1, according to at least some embodiments. The method of FIG. 5 may, for example, be performed at 420 of FIG. 4. The method of FIG. 5 assumes slice-based encoding and transmission is being performed. However, in some embodiments, tile-based encoding and transmission may be performed.

As indicated at 510, the pre-filter component applies lens warp and/or foveation filters to pixel blocks in a slice of the frame. In some embodiments, pre-filtering may include performing a lens warp on the frames on the base station prior to the wavelet transform. The lens warp is performed to correct for the distortion of the images introduced by the lenses on the device that the images are viewed through, thus improving quality of the images. In some embodiments, the device may store lens warp data for the lenses, for example generated by a calibration process, and may provide the lens warp data to the base station over the wireless connection. The base station may then perform the lens warp on the frames based on the lens warp data for that device. Performing the lens warp on the base station in the pre-filter stage may reduce the resolution of the frames prior to performing the wavelet transform and encoding, which may help in improving compression, and may reduce latency and bandwidth usage on the wireless link. In addition, by performing the lens warp on the base station in the pre-filter stage rather than on the device after decoding, filtering of the image data may only need to be performed once, as opposed to performing filtering on the base station to reduce resolution prior to encoding and then performing lens warp filtering on the device.

In some embodiments, pre-filtering at 510 may also include filtering to reduce resolution in peripheral regions while maintaining higher resolution in foveated regions. In some embodiments, gaze tracking information obtained from the device may be used to identify the direction in which the user is currently looking. A region of the frame that corresponds to the fovea (referred to as the foveated region) may be identified based at least in part on the determined gaze direction. The peripheral region (i.e. the portion of the frame outside the foveated region) may be pre-filtered to reduce information based on knowledge of the human vision system, for example by filtering high frequency information and/or increasing color compression. Pre-filtering of the peripheral region may help to provide improved compression of the frame.

As indicated at 520, the wavelet transform component applies a wavelet transform technique to the pixel blocks to decompose the pixel data into N (e.g., 7) frequency bands. The frequency bands are then organized into blocks that are provided to a block-based encoder for encoding/compression. As an example, a frame may be divided into 128×128 blocks, and a two-level wavelet decomposition may be applied to each 128×128 block to generate 16 32×32 blocks of frequency data representing seven frequency bands, for example as illustrated in FIG. 3C.

As indicated at 530, the encoder applies an encoding technique to the frequency bands in the blocks to compress the data. The encoder may, for example, be a High Efficiency Video Coding (HEVC) encoder. However, other encoding techniques may be used in some embodiments. Decomposing the pixel data into frequency bands as indicated at element 520 allows the frequency bands to be buffered and processed as separate streams by the encoder. Processing the frequency bands as separate streams allows the encoder component to multiplex the processing of the independent streams. In block-based encoding methods such as HEVC encoding, blocks (referred to as coding tree units (CTUs)) are processed in a pipeline at multiple stages; two or more blocks may be at different stages of the pipeline at a given clock cycle, and the blocks move through the pipeline as the clock cycles. The processing of a given block may have dependencies on one or more previously processed neighbor blocks, for example one or more blocks in the row above the given block and/or the block to the left of the given block. By multiplexing the processing of the streams, the encoder spaces out the processing of the blocks in a given stream, thus providing additional clock cycles to process a neighbor block on which a given block has dependencies. For example, the block to the left of the given block may be several stages ahead of the given block in the pipeline when the given block reaches a stage that depends on the previously processed neighbor block. This allows the encoder to better handle dependencies on previously processed blocks, and reduces or eliminates the need to wait for completion of processing of a neighbor block in the pipeline before processing the given block at a stage that depends on the neighbor block.

As indicated at 540, the wireless interface packetizes the compressed data and sends the packets to the device over the wireless connection.

Decomposing the pixel data into frequency bands as indicated at element 520 allows the frequency bands to be prioritized by the encoder at element 530 and the wireless interface at element 540. Typically, in image and video transmission, the lower frequencies are more important, while the higher frequencies are less important. Higher frequencies usually correspond to details in the image, and thus can be considered as lower priority. The higher frequency bands contain a smaller percentage of the energy in the image. Most of the energy is contained in the lower frequency bands. Decomposing the pixel data into frequency bands thus provides a priority ordering to the data stream that can be leveraged by the encoder and the wireless interface when encoding and transmitting the data stream. For example, in some embodiments, different compression techniques may be used on the different frequency bands, with more aggressive compression applied to the lower priority bands, and more conservative compression applied to the higher priority bands. As another example, the priority ordering of the frequency bands may help in providing graceful degradation of the VR/MR system. Performance of the wireless connection can be monitored, and feedback from the device may be considered, to track performance of the overall system. If the system is falling behind for some reason, for example if the wireless connection degrades and bandwidth capacity of the wireless connection drops below a threshold, the encoder and wireless interface may prioritize the encoding and transmission of one or more of the lower frequency bands, and may reduce or drop the encoding and/or transmission of one or more of the frequency levels that have been assigned a lower priority level, for example one or more of the higher frequency bands.

At 550, if there are more slices to be encoded and transmitted, the method returns to element 510 to process the next slice. Otherwise, at 560, if there are more frames to be encoded and transmitted, the method returns to element 510 to begin processing the next frame.

Figure 6:
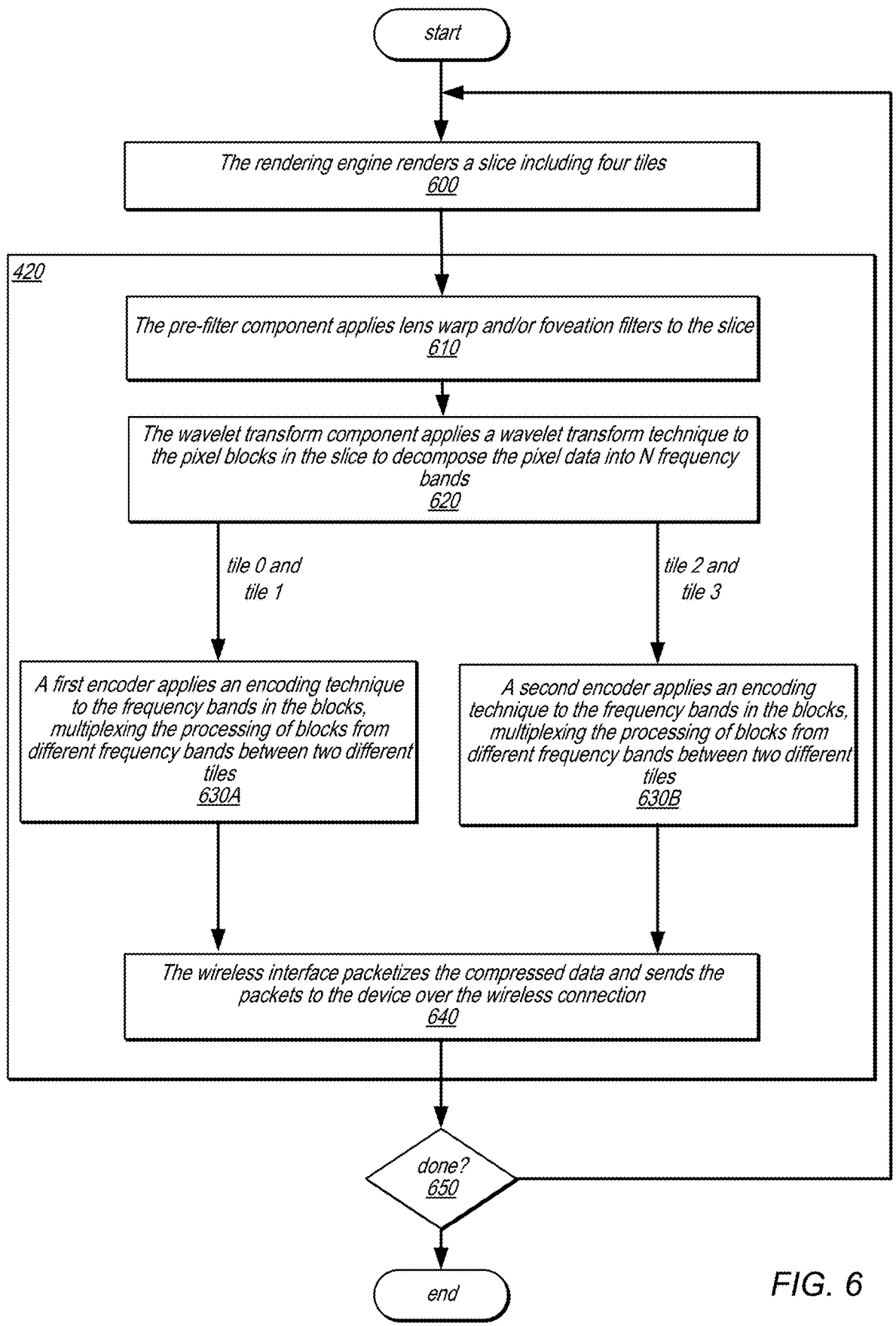
FIG. 6 is a flowchart of a method of operation for a video encoding system as illustrated in FIG. 2, according to at least some embodiments.

FIG. 6 is a flowchart of a method of operation for a video encoding system as illustrated in FIG. 2, according to at least some embodiments. The method of FIG. 6 may, for example, be performed at 420 of FIG. 4. In the method of FIG. 6, the video encoding system may perform tile-based encoding using multiple encoders to process respective tiles from each slice.

As indicated at 600, a rendering engine renders a slice including multiple tiles (four tiles, in this example), each tiles including multiple pixel blocks (four 128×128 pixel blocks, in this example).

As indicated at 610, the pre-filter component applies lens warp and/or foveation filters to the slice. In some embodiments, pre-filtering may include performing a lens warp on the frames on the base station prior to the wavelet transform. The lens warp is performed to correct for the distortion of the images introduced by the lenses on the device that the images are viewed through, thus improving quality of the images. In some embodiments, the device may store lens warp data for the lenses, for example generated by a calibration process, and may provide the lens warp data to the base station over the wireless connection. The base station may then perform the lens warp on the frames based on the lens warp data for that device. Performing the lens warp on the base station in the pre-filter stage may reduce the resolution of the frames prior to performing the wavelet transform and encoding, which may help in improving compression, and may reduce latency and bandwidth usage on the wireless link. In addition, by performing the lens warp on the base station in the pre-filter stage rather than on the device after decoding, filtering of the image data may only need to be performed once, as opposed to performing filtering on the base station to reduce resolution prior to encoding and then performing lens warp filtering on the device.

In some embodiments, pre-filtering at 610 may also include filtering to reduce resolution in peripheral regions while maintaining higher resolution in foveated regions. In some embodiments, gaze tracking information obtained by the device may be used to identify the direction in which the user is currently looking. A region of the frame that corresponds to the fovea (referred to as the foveated region) may be identified based at least in part on the determined gaze direction. The peripheral region (i.e. the portion of the frame outside the foveated region) may be pre-filtered to reduce information based on knowledge of the human vision system, for example by filtering high frequency information and/or increasing color compression. Pre-filtering of the peripheral region may help to provide improved compression of the frame.

In some embodiments, the video encoding system may include a single pre-filter component that process the tiles. In some embodiments, the video encoding system may include a separate pre-filter component for processing each tile. In some embodiments, the video encoding system may include multiple (e.g., 2) pre-filter components that each process multiple (e.g., 2) tiles.

As indicated at 620, the wavelet transform component applies a wavelet transform technique to the pixel blocks in the slice to decompose the pixel data into N (e.g., 7) frequency bands. The frequency bands are then organized into blocks (e.g., CTUs) that can be provided to a block-based encoder for encoding/compression. As an example, a frame may be divided into 128×128 blocks, and a two-level wavelet decomposition may be applied to each 128×128 block to generate 16 32×32 blocks of frequency data representing seven frequency bands, for example as illustrated in FIG. 3C.

In some embodiments, the video encoding system may include a single wavelet transform component that process the tiles. In some embodiments, the video encoding system may include a separate wavelet transform component for processing each tile. In some embodiments, the video encoding system may include multiple (e.g., 2) wavelet transform components that each process multiple (e.g., 2) tiles.

In the method of FIG. 6, an example video encoding system includes two encoders configured to encode the blocks of frequency data from different ones of the slices that are generated at element 620 in parallel. For example, a first encoder may be configured to encode blocks from slices 0 and 1, and a second encoder may be configured to encode blocks from slices 2 and 3. As indicated at 630A, the first encoder applies an encoding technique to the frequency bands in the blocks of tiles 0 and 1, multiplexing the processing of blocks from different frequency bands between the two different tiles. As indicated at 630B, a second encoder applies an encoding technique to the frequency bands in the blocks of tiles 2 and 3, multiplexing the processing of blocks from different frequency bands between the two different tiles.

The encoders may, for example, be a High Efficiency Video Coding (HEVC) encoders. However, other encoding techniques may be used in some embodiments. Decomposing the pixel data into frequency bands as indicated at element 620 allows the frequency bands to be buffered and processed as separate streams by the encoders at elements 630A and 630B. Processing the frequency bands as separate streams allows the encoders to multiplex the processing of the independent streams. In block-based encoding methods such as HEVC encoding, blocks (referred to as coding tree units (CTUs)) are processed in a pipeline at multiple stages; two or more blocks may be at different stages of the pipeline at a given clock cycle, and the blocks move through the pipeline as the clock cycles. The processing of a given block may have dependencies on one or more previously processed neighbor blocks, for example one or more blocks in the row above the given block and/or the block to the left of the given block. By multiplexing the processing of the streams, the encoder spaces out the processing of the blocks in a given stream, thus providing additional clock cycles to process a neighbor block on which a given block has dependencies. For example, the block to the left of the given block may be several stages ahead of the given block in the pipeline when the given block reaches a stage that depends on the previously processed neighbor block. This allows the encoder to better handle dependencies on previously processed blocks, and reduces or eliminates the need to wait for completion of processing of a neighbor block in the pipeline before processing the given block at a stage that depends on the neighbor block.

As indicated at 640, the wireless interface packetizes the compressed data generated by the encoders at element 530 and sends the packets to the device over the wireless connection. As indicated by the arrow returning from 650 to 600, the method continues as long as the user is using the VR/MR system.

Decomposing the pixel data into frequency bands as indicated at element 620 allows the frequency bands to be prioritized by the encoders at elements 630A and 630B and the wireless interface at element 640. Typically, in image and video transmission, the lower frequencies are more important, while the higher frequencies are less important.

Higher frequencies usually correspond to details in the image, and thus can be considered as lower priority. The higher frequency bands contain a smaller percentage of the energy in the image. Most of the energy is contained in the lower frequency bands. Decomposing the pixel data into frequency bands thus provides a priority ordering to the data stream that can be leveraged by the encoder and the wireless interface when encoding and transmitting the data stream. For example, in some embodiments, different compression techniques may be used on the different frequency bands, with more aggressive compression applied to the lower priority bands, and more conservative compression applied to the higher priority bands. As another example, the priority ordering of the frequency bands may help in providing graceful degradation of the VR/MR system. Performance of the wireless connection can be monitored, and feedback from the device may be considered, to track performance of the overall system. If the system is falling behind for some reason, for example if the wireless connection degrades and bandwidth capacity of the wireless connection drops below a threshold, the encoder and wireless interface may prioritize the encoding and transmission of one or more of the lower frequency bands, and may reduce or drop the encoding and/or transmission of one or more of the frequency levels that have been assigned a lower priority level, for example one or more of the higher frequency bands.

While embodiments are described in which each slice is divided into four tiles and two encoders operate on respective tiles from each slice, slices may be divided into more tiles (e.g., six or eight tiles) in some embodiments, and more encoders (e.g., three or four encoders) may be used in some embodiments.

Rate Control

An encoder may employ a rate control method or algorithm to dynamically adjust encoder parameters to achieve a target bitrate. A rate control method may estimate video bitrate based on the available bandwidth of the wireless connection. The estimated bitrate may be used to adjust the encoder parameters to ensure that the coded bit stream can be transmitted successfully while optimizing usage of the available bandwidth. Typically, rate control methods for video streaming systems work over a time constant of a frame or two frames to estimate video bitrate and adjust encoder parameters accordingly.

A target of a VR/MR system that implements an embodiment of the video encoding system as described herein may be to provide very low latency (e.g., 4-5 milliseconds) between the time the virtual content is rendered on the base station and the time the virtual content is displayed on the device while minimizing errors (e.g., dropped packets) and maximizing bandwidth usage over the wireless connection. The targeted low latency for the system is a challenge for rate control in the encoder when encoding data to be transmitted over the wireless connection to the device.

In some embodiments, the video encoding system includes a wavelet transform component that performs a 2-layer wavelet decomposition that decomposes blocks of pixels (e.g., 64×64 or 128×128 blocks) from a slice of a frame into multiple (e.g., seven) different frequency bands, followed by a block-based encoder such as HEVC that encodes the frequency bands. In some embodiments, to perform rate control under the strict latency requirements of the VR/MR system, instead of working over a time constant of a frame or two frames to adjust encoder parameters, a rate control component may adjust encoder parameters (e.g., quantization parameters for the frequency bands) for each slice. In some embodiments, the frequency bands for a slice may be buffered in local memory after the wavelet transform so that complexity statistics may be calculated across the frequency bands prior to encoding, for example by a complexity analysis component of the video encoding system. In some embodiments, the complexity statistics may include one or more of, but are not limited to, pixel gradient and variance of size for the CTU blocks. The complexity statistics may then be used by a rate control component in determining quantization parameters for the frequency bands for modulating the rate in the encoder for the current slice. Calculating the complexity statistics on the buffered frequency bands allows the video encoding system to estimate the amount of complexity in a slice before encoding the slice.

In some embodiments, the rate control component may examine statistics for one or more previously processed frames to determine an actual number of bits that were used to encode co-sited blocks or slices of the frame(s). This information may then be used in combination with the complexity statistics for a current slice in determining the quantization parameters for the current slice.

In some embodiments, the quantization parameters for the frequency bands may be calculated jointly to optimize the overall displayed quality of the frames after decoder reconstruction and wavelet synthesis is performed on the device. A method for rate allocation between the frequency bands is to find an operating point in each of the frequency bands that results in equal slopes on the operational rate distortion curve. In some embodiments the operational rate distortion curve may be estimated using a combination of statistics from the entropy coding stage of the encoder pipeline with the fact that the rate of the coefficients can be well approximated for quantization parameter steps of 6.

In some embodiments, there may be an area of interest within an image (e.g., the foveated region) that should have higher resolution than the surrounding region (e.g., the peripheral region) in the same image. In some embodiments, complexity statistics from a previous frame along with the foveated region from the previous frame may be stored and used in calculating the quantization parameters for the frequency bands in slices of a current frame. As an example, for each block that is to be encoded, the foveated region of a previous frame may be used to modulate the complexity statistics that were calculated for the previous frame. The resulting complexity statistics may then be used in addition to the complexity statistics calculated for slices of a current frame in determining the quantization parameters.

In some embodiments, the rate control component may adjust encoder parameters (e.g., quantization parameters for the frequency bands or priority levels) at the block level rather than at the slice level. In some embodiments, complexity statistics may be calculated for each block of a slice, and quantization parameters may be determined for the blocks.

Figure 7:
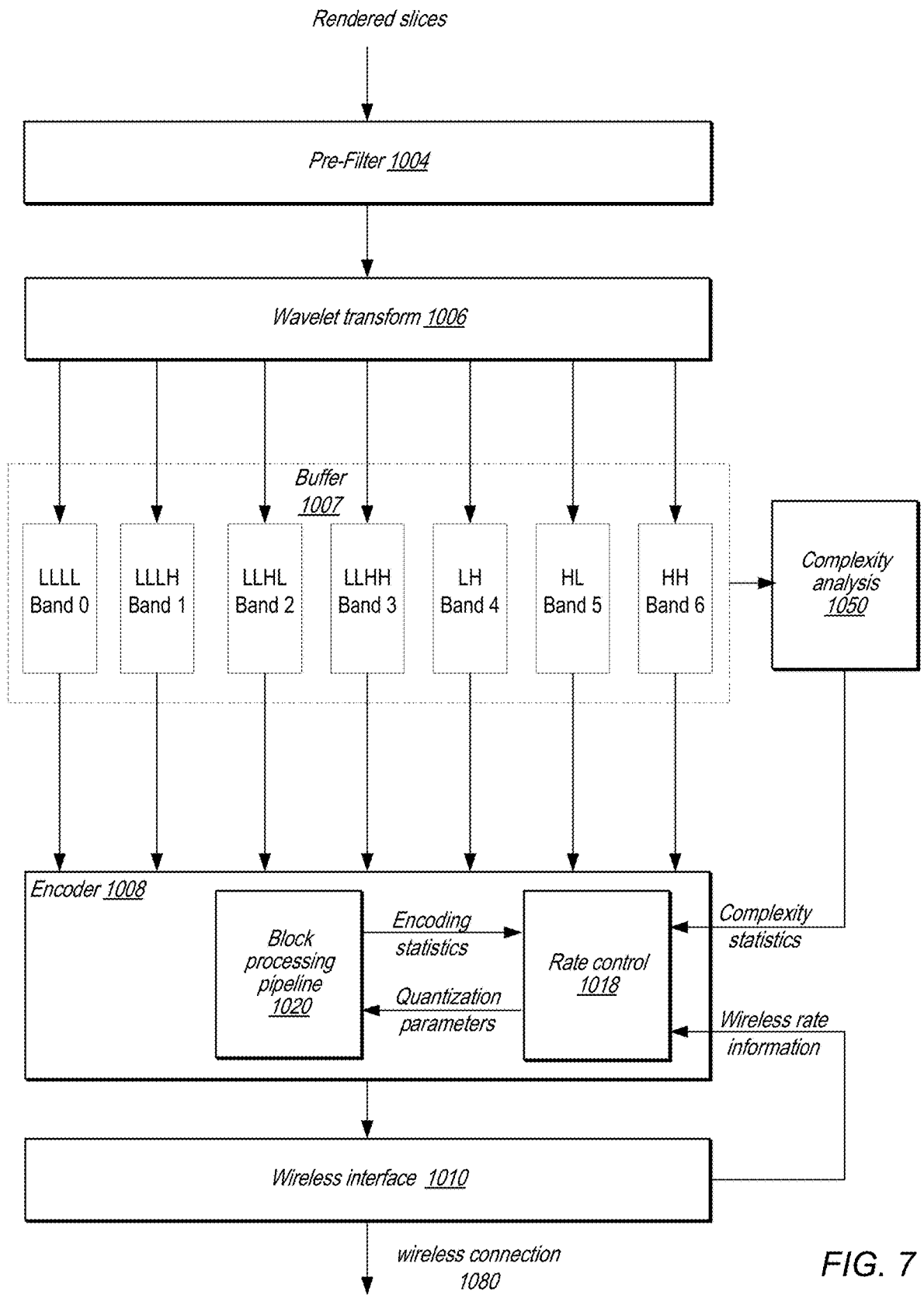
FIG. 7 is a block diagram illustrating a video encoding system as illustrated in FIG. 1 or 2 in which complexity statistics for the frequency bands are calculated and used in generating quantization parameters for encoding, according to at least some embodiments.

FIG. 7 is a block diagram illustrating a video encoding system as illustrated in FIG. 1 or 2 in which complexity statistics for the frequency bands are calculated prior to encoding and used in generating quantization parameters for encoding, according to at least some embodiments.

In some embodiments, rendered slices of a frame that include pixel data are first processed by a pre-filter 1004 component, for example an N-channel filter bank. In some embodiments, gaze tracking information obtained from the device may be used to identify the direction in which the user is currently looking. A region of the frame that corresponds to the fovea (referred to as the foveated region) may be identified based at least in part on the determined gaze direction. The peripheral region (i.e. the portion of the frame outside the foveated region) may be pre-filtered to reduce information based on knowledge of the human vision system, for example by filtering high frequency information and/or increasing color compression.

The output of the pre-filter 1004 is processed by a wavelet transform 1006 component. In some embodiments, the wavelet transform 1006 component performs a 2-layer wavelet decomposition that decomposes blocks of pixels (e.g., 64×64 or 128×128 blocks) from a slice of a frame into multiple (e.g., seven) different frequency bands. The frequency bands for a slice may be buffered 1007 after the wavelet transform 1005 so that complexity statistics may be calculated across the frequency bands for the slice by a complexity analysis 1050 component of the video encoding system prior to encoding. In some embodiments, the complexity statistics may include one or more of, but are not limited to, pixel gradient and variance of size for the CTU blocks. The complexity analysis 1050 component provides the complexity statistics for the frequency bands in the slice to the rate control 1018 component of the encoder 1008. The rate control 1018 component then calculates quantization parameters for each of the frequency bands in the slice based at least in part on the complexity statistics.

In some embodiments, the quantization parameters for the frequency bands may be calculated by the rate control 1018 component jointly to allocate the rate between the frequency bands while optimizing the overall displayed quality of the frames after decoder reconstruction and wavelet synthesis is performed on the device. A method for rate allocation between the frequency bands is to find an operating point in each of the frequency bands that results in equal slopes on the operational rate distortion curve. In some embodiments the operational rate distortion curve may be estimated using a combination of statistics from the entropy coding stage of the encoder pipeline 1020 with the fact that the rate of the coefficients can be well approximated for quantization parameter steps of 6.

In some embodiments, the rate control 1018 component may examine statistics for one or more previously processed frames to determine an actual number of bits that were used to encode co-sited blocks or slices of the frame(s). This information may then be used in combination with the complexity statistics for the current slice in determining the quantization parameters for the current slice.

In some embodiments, there may be an area of interest within an image (e.g., the foveated region) that should have higher resolution than the surrounding region (e.g., the peripheral region) in the same image. In some embodiments, complexity statistics from a previous frame along with the foveated region from the previous frame may be stored and used by the rate control 1018 component in calculating the quantization parameters for the frequency bands in slices of a current frame. As an example, for each block that is to be encoded, the foveated region of a previous frame may be used to modulate the complexity statistics that were calculated for the previous frame. The resulting complexity statistics may then be used in addition to the complexity statistics calculated for slices of a current frame in determining the quantization parameters.

The rate control 1018 component provides the quantization parameters for the frequency bands in the slice to the block processing pipeline 1020, which uses the quantization parameters to encode the frequency bands of the current slice. The encoded frequency bands are provided to the wireless interface 1010, which packetizes and transmits the encoded frequency bands over a wireless connection 1080 to an device.

A goal of the video encoding system is to optimize quality of the video stream to the device while maximizing bandwidth usage and minimizing latency over the wireless connection 1080 to the device. In some embodiments, to help achieve this goal, the wireless interface 1010 may provide current wireless connection information as feedback to the rate control 1018 component of the encoder 1008. The rate control component 1018 may use this information in determining quantization parameters for the frequency bands. In some embodiments, the wireless interface 1010 may track the instantaneous total bit rate of the wireless connection 1080, and may also track the dropped packet rate on the connection 1080. In some embodiments, the wireless interface 1010 feeds the current bit rate for the wireless connection 1080 back to the rate control 1018 component, which may use this information to allocate the available bit rate among the different frequency bands. For example, if the bit rate of the wireless connection 1080 is currently low, the rate control 1018 component may adjust the quantization parameter of one or more of the higher frequency bands so that fewer bits are allocated to those bands. In some embodiments, the wireless interface 1010 also feeds the current dropped packet rate for the wireless connection 1080 back to the rate control 1018 component; the rate control 1018 component may use the current dropped packet rate and the current bit rate to balance the adjustment of the quantization parameters of the frequency bands to reduce or minimize the dropped packet rate while maximizing bandwidth usage at the current bit rate in order to optimize the quality of the video stream.

In some embodiments, the rate control 1018 component may adjust the quantization parameters for the frequency bands at the block level rather than at the slice level.

Figure 8:
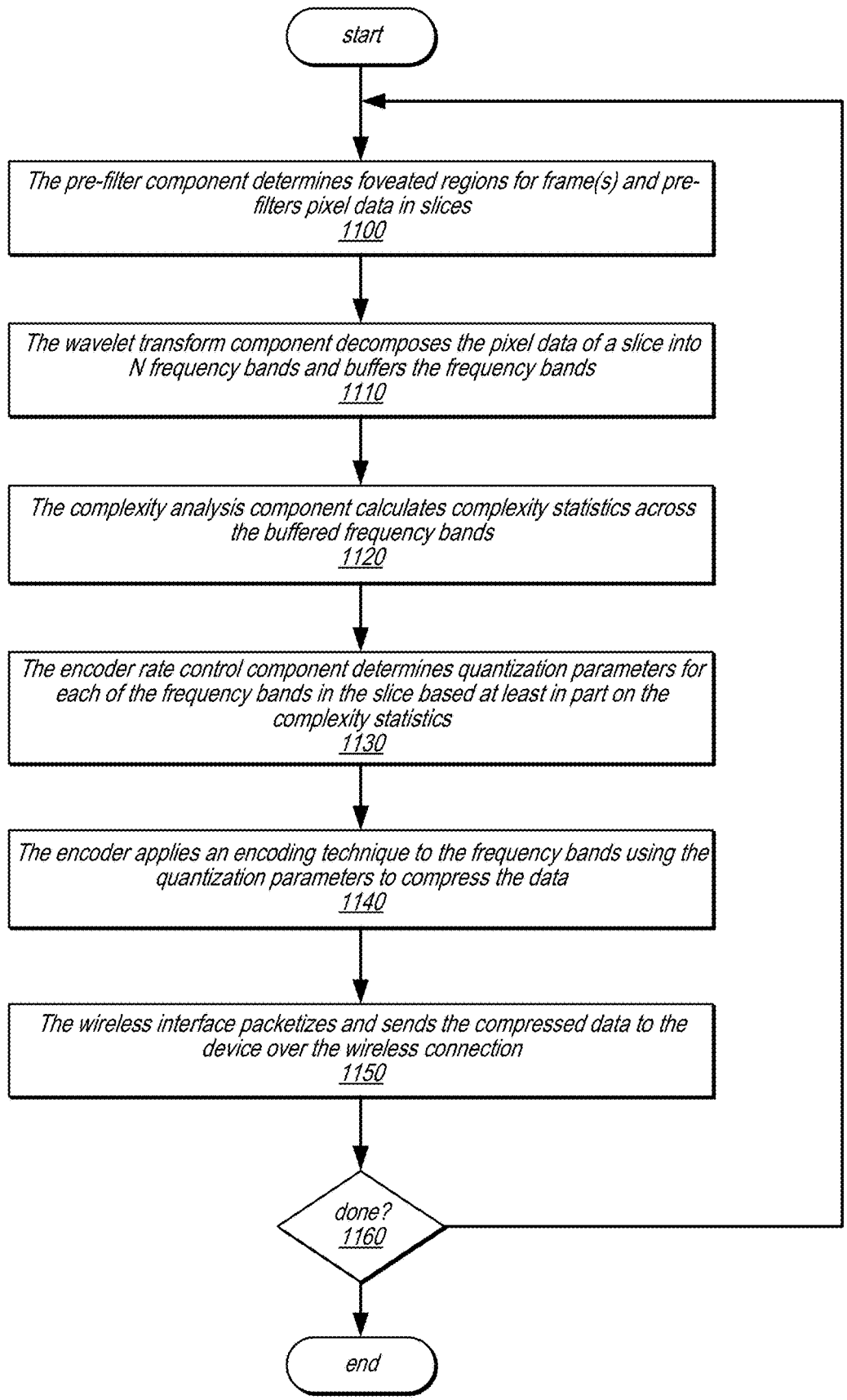
FIG. 8 is a flowchart of a method of operation for a video encoding system as illustrated in FIG. 7, according to at least some embodiments.

FIG. 8 is a flowchart of a method of operation for a video encoding system as illustrated in FIG. 7, according to at least some embodiments. As indicated at 1100, the pre-filter component determines foveated regions for frame(s) and pre-filters pixel data in slices. In some embodiments, rendered slices of a frame that include pixel data are first processed by a pre-filter component, for example an N-channel filter bank. In some embodiments, gaze tracking information obtained from the device may be used to identify the direction in which the user is currently looking. A region of the frame that corresponds to the fovea (referred to as the foveated region) may be identified based at least in part on the determined gaze direction. The peripheral region (i.e. the portion of the frame outside the foveated region) may be pre-filtered to reduce information based on knowledge of the human vision system, for example by filtering high frequency information and/or increasing color compression.

As indicated at 1110, the wavelet transform component decomposes the pre-filtered pixel data into N (e.g., 7) frequency bands. In some embodiments, the wavelet transform component performs a 2-layer wavelet decomposition that decomposes blocks of pixels (e.g., 64×64 or 128×128 blocks) from a slice of a frame into multiple (e.g., seven) different frequency bands. The frequency bands for a slice may be buffered after the wavelet transform so that complexity statistics may be calculated across the frequency bands for the slice by a complexity analysis component of the video encoding system prior to encoding.

As indicated at 1120, the complexity analysis component calculates complexity statistics across the frequency bands. In some embodiments, the complexity statistics may include one or more of, but are not limited to, pixel gradient and variance of size for the CTU blocks. The complexity analysis component provides the complexity statistics for the frequency bands in the slice to the rate control component of the encoder.

As indicated at 1130, the encoder rate control component determines quantization parameters for each of the frequency bands in the slice based at least in part on the complexity statistics. In some embodiments, the quantization parameters for the frequency bands may be calculated by the rate control component jointly to allocate the rate between the frequency bands while optimizing the overall displayed quality of the frames after decoder reconstruction and wavelet synthesis is performed on the device. A method for rate allocation between the frequency bands is to find an operating point in each of the frequency bands that results in equal slopes on the operational rate distortion curve. In some embodiments the operational rate distortion curve may be estimated using a combination of statistics from the entropy coding stage of the encoder pipeline 1020 with the fact that the rate of the coefficients can be well approximated for quantization parameter steps of 6.

In some embodiments, the rate control component may examine statistics for one or more previously processed frames to determine an actual number of bits that were used to encode co-sited blocks or slices of the frame(s). This information may then be used in combination with the complexity statistics for the current slice in determining the quantization parameters for the current slice.

In some embodiments, there may be an area of interest within an image (e.g., the foveated region) that should have higher resolution than the surrounding region (e.g., the peripheral region) in the same image. In some embodiments, complexity statistics from a previous frame along with the foveated region from the previous frame may be stored and used by the rate control component in calculating the quantization parameters for the frequency bands in slices of a current frame. As an example, for each block that is to be encoded, the foveated region of a previous frame may be used to modulate the complexity statistics that were calculated for the previous frame. The resulting complexity statistics may then be used in addition to the complexity statistics calculated for slices of a current frame in determining the quantization parameters.

As indicated at 1140, the encoder (e.g., an HEVC encoder) applies an encoding technique to the frequency bands using the quantization parameters to compress the data. The rate control component provides the quantization parameters for the frequency bands in the slice to the block processing pipeline of the encoder, which uses the quantization parameters to encode the frequency bands of the current slice. The encoded frequency bands are provided to the wireless interface of the base station.

As indicated at 1150, the wireless interface packetizes and sends the compressed data to the device over the wireless connection. In some embodiments, the wireless interface may provide current wireless connection information as feedback to the rate control component of the encoder. The rate control component may use this information in determining quantization parameters for the frequency bands. In some embodiments, the wireless interface may track the instantaneous total bit rate of the wireless connection, and may also track the dropped packet rate on the connection. In some embodiments, the rate control component may use the current bit rate for the wireless connection to allocate the available bit rate among the different frequency bands. In some embodiments, the rate control component may use the current dropped packet rate and the current bit rate to balance the adjustment of the quantization parameters of the frequency bands to reduce or minimize the dropped packet rate in order to optimize the quality of the video stream at the current bit rate.

As indicated by the arrow returning from element 1160 to element 1100, the method may continue as long as there is data to be transmitted to the device.

Example VR/MR System

Figure 9:
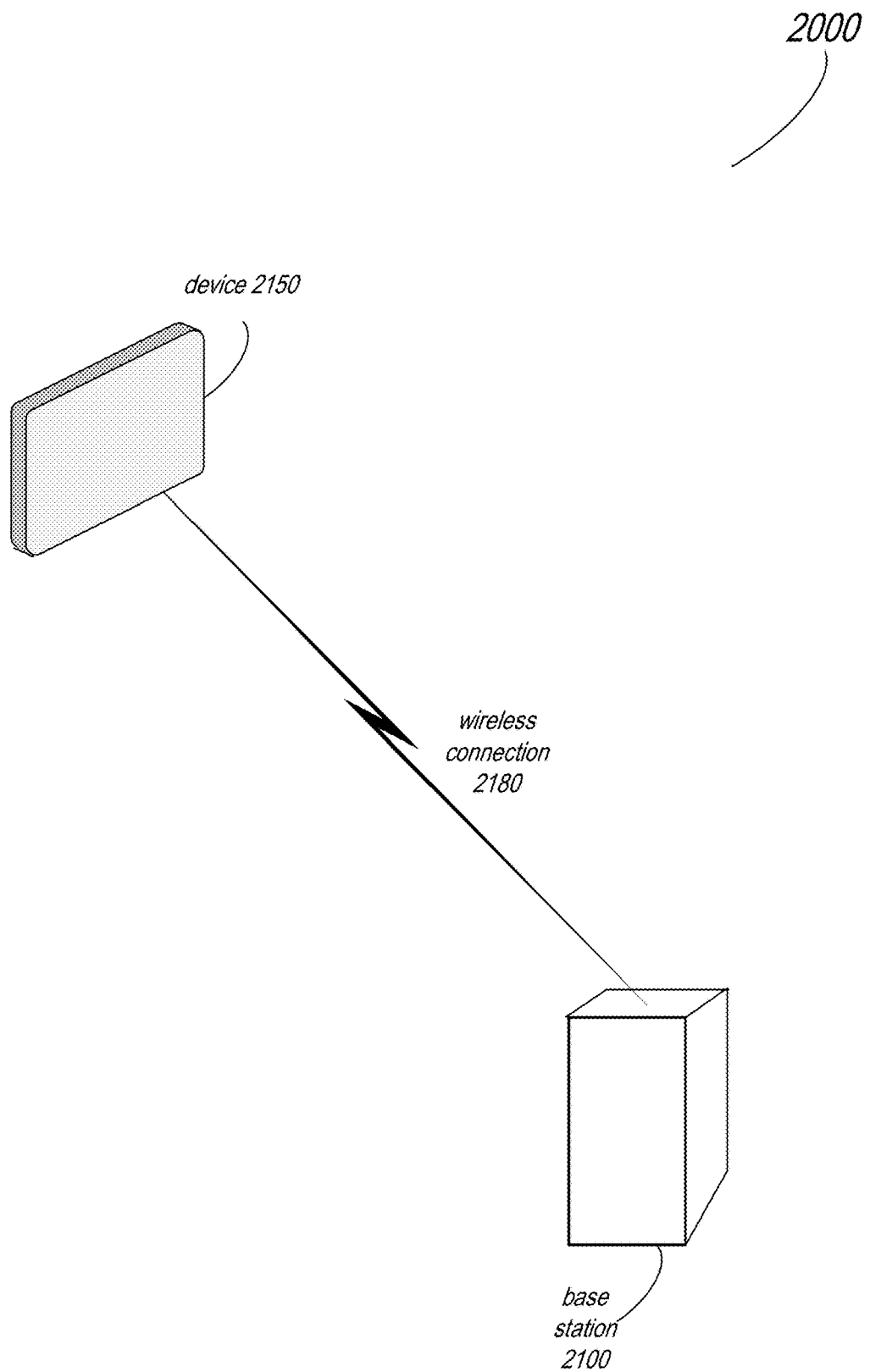
FIG. 9 illustrates an example VR/MR system that may implement a video encoding system, according to at least some embodiments.

FIG. 9 illustrates an example VR/MR system 2000 that may implement a video encoding system, according to at least some embodiments. A VR/MR system 2000 may include at least one device 2150 (e.g., a notebook or laptop computer, pad or tablet device, smartphone, hand-held computing device or an HMD such as a headset, helmet, goggles, or glasses that may be worn by a user) and a computing device 2100 (referred to herein as a base station). The base station 2100 renders VR or MR frames including virtual content, encodes the frames, and transmits the encoded frames over a wireless connection 2180 to the device 2150 for decoding and display by the device 2150.

The base station 2100 and device 2150 may each include wireless communications technology that allows the base station 2100 and device 2150 to communicate and exchange data via the wireless connection 2180. In some embodiments, the wireless connection 2180 may be implemented according to a proprietary wireless communications technology that provides a highly directional wireless link between the device 2150 and the base station 2100. However, other commercial (e.g., Wi-Fi, Bluetooth, etc.) or proprietary wireless communications technologies may be used in some embodiments.

In some embodiments, the device 2150 may include sensors that collect information about the user's environment (e.g., video, depth information, lighting information, etc.) and/or about the user (e.g., the user's expressions, eye movement, gaze direction, hand gestures, etc.). The device 2150 may transmit at least some of the information collected by sensors to the base station 2100 via wireless connection 2180. The base station 2100 may render frames for display by the device 2150 that include virtual content based at least in part on the various information obtained from the sensors, encode the frames, and transmit the encoded frames to the device 2150 for decoding and display to the user via the wireless connection 2180. To encode and transmit the frames, the base station 2100 may implement a video encoding system as illustrated in FIGS. 1 through 8.

Figure 10:
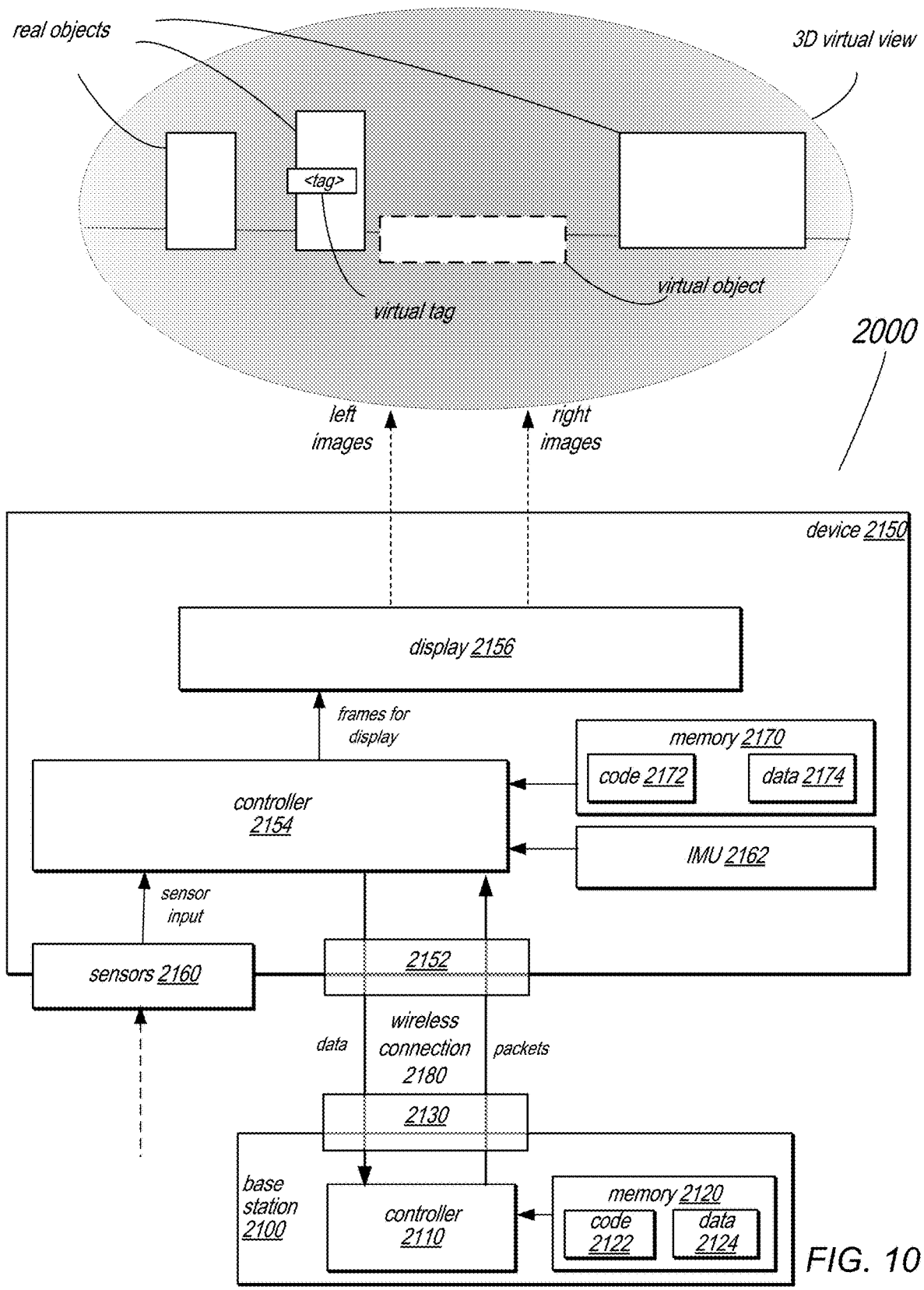
FIG. 10 is a block diagram illustrating components of a VR/MR system as illustrated in FIG. 9, according to at least some embodiments.

FIG. 10 is a block diagram illustrating functional components of and processing in an example VR/MR system as illustrated in FIG. 9, according to some embodiments. Device 2150 may be, but is not limited to, a notebook or laptop computer, pad or tablet device, smartphone, handheld computing device or an HMD such as a headset, helmet, goggles, or glasses that may be worn by a user. Device 2150 may include a display 2156 component or subsystem that may implement any of various types of virtual or augmented reality display technologies. For example, an HMD device 2150 may be a near-eye system that displays left and right images on screens in front of the user's eyes that are viewed by a subject, such as DLP (digital light processing), LCD (liquid crystal display) and LCoS (liquid crystal on silicon) technology VR systems. As another example, an HMD device 2150 may be a direct retinal projector system that scans left and right images, pixel by pixel, to the subject's eyes. To scan the images, left and right projectors generate beams that are directed to left and right reflective components (e.g., ellipsoid mirrors) located in front of the user's eyes; the reflective components reflect the beams to the user's eyes. To create a three-dimensional (3D) effect, virtual content at different depths or distances in the 3D virtual view are shifted left or right in the two images as a function of the triangulation of distance, with nearer objects shifted more than more distant objects.

Device 2150 may also include a controller 2154 configured to implement device-side functionality of the VR/MR system 2000 as described herein. In some embodiments, device 2150 may also include memory 2170 configured to store software (code 2172) of the device component of the VR/MR system 2000 that is executable by the controller 2154, as well as data 2174 that may be used by the software when executing on the controller 2154. In various embodiments, the controller 2154 may be a uniprocessor system including one processor, or a multiprocessor system including several processors (e.g., two, four, eight, or another suitable number). The controller 2154 may include central processing units (CPUs) configured to implement any suitable instruction set architecture, and may be configured to execute instructions defined in that instruction set architecture. For example, in various embodiments the controller 2154 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. The controller 2154 may employ any microarchitecture, including scalar, superscalar, pipelined, superpipelined, out of order, in order, speculative, non-speculative, etc., or combinations thereof. The controller 2154 may include circuitry to implement microcoding techniques. The controller 2154 may include one or more processing cores each configured to execute instructions. The controller 2154 may include one or more levels of caches, which may employ any size and any configuration (set associative, direct mapped, etc.). In some embodiments, the controller 2154 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, the controller 2154 may include one or more other components for processing and rendering video and/or images, for example image signal processors (ISPs), encoder/decoders (codecs), etc. In some embodiments, controller 2154 may include at least one system on a chip (SOC).

The memory 2170 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, sensors 2160 may include, but are not limited to, one or more gaze tracking sensors (e.g., IR cameras with an IR illumination source) that may be used to track position and movement of the user's eyes. In some embodiments, there may be two gaze tracking sensors, with each gaze tracking sensor tracking a respective eye. In some embodiments, the information collected by the gaze tracking sensors may be used to adjust the rendering of images by the base station 2100, and/or to adjust the projection of the images by the projection system of the device 2150, based on the direction and angle at which the user's eyes are looking. For example, in some embodiments, content of the images in a region around the location at which the user's eyes are currently looking may be rendered with more detail and at a higher resolution than content in regions at which the user is not looking, which allows available processing time for image data to be spent on content viewed by the foveal regions of the eyes rather than on content viewed by the peripheral regions of the eyes. Similarly, content of images in regions at which the user is not looking may be compressed more than content of the region around the point at which the user is currently looking. In some embodiments there may be two gaze tracking sensors located on an inner surface of the device 2150 at positions such that the sensors have views of respective ones of the user's eyes. However, in various embodiments, more or fewer gaze tracking sensors may be used, and gaze tracking sensors may be positioned at other locations. In an example non-limiting embodiment, each gaze tracking sensor may include an IR light source and IR camera, for example a 400×400 pixel count camera with a frame rate of 120 FPS or greater, HFOV of 70 degrees, and with a working distance of 10 millimeters (mm) to 80 mm.

In some embodiments, the device 2150 may include at least one inertial-measurement unit (IMU) 2162 configured to detect position, orientation, and/or motion of the device 2150, and to provide the detected position, orientation, and/or motion data to the controller 2154 of the device 2150 and/or to the base station 2100.

Device 2150 may also include a wireless interface 2152 configured to communicate with an external base station 2100 via a wireless connection 2180 to send sensor inputs to the base station 2100 and to receive compressed rendered frames, slices, or tiles from the base station 2100. In some embodiments, the wireless interface 2152 may implement a proprietary wireless communications technology that provides a highly directional wireless link between the device 2150 and the base station 2100. However, other commercial (e.g., Wi-Fi, Bluetooth, etc.) or proprietary wireless communications technologies may be used in some embodiments.

The base station 2100 may be an external device (e.g., a computing system, game console, etc.) that is communicatively coupled to device 2150 via a wireless interface 2180. The base station 2100 may include one or more of various types of processors (e.g., SOCs, CPUs, ISPs, GPUs, codecs, and/or other components) for rendering, filtering, encoding, and transmitting video and/or images. The base station 2100 may render frames (each frame including a left and right image) that include virtual content based at least in part on the various inputs obtained from the sensors 2160 via the wireless connection 2180, filter and compress the rendered frames (or slices of the frames) using a video encoding system as described herein, and transmit the compressed frames or slices to the device 2150 for display.

Base station 2100 may be or may include any type of computing system or computing device, such as a desktop computer, notebook or laptop computer, pad or tablet device, smartphone, hand-held computing device, game controller, game system, and so on. Base station 2100 may include a controller 2110 comprising one or more processors that implement base-side functionality of the VR/MR system 2000 including the video encoding system as described herein. Base station 2100 may also include memory 2120 configured to store software (code 2122) of the base station component of the VR/MR system 2000 that is executable by the base station controller 2110, as well as data 2124 that may be used by the software when executing on the controller 2110.

In various embodiments, the base station controller 2110 may be a uniprocessor system including one processor, or a multiprocessor system including several processors (e.g., two, four, eight, or another suitable number). The controller 2110 may include central processing units (CPUs) configured to implement any suitable instruction set architecture and may be configured to execute instructions defined in that instruction set architecture. For example, in various embodiments the controller 2110 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. The controller 2110 may employ any microarchitecture, including scalar, superscalar, pipelined, superpipelined, out of order, in order, speculative, non-speculative, etc., or combinations thereof. Controller 2110 may include circuitry to implement microcoding techniques. The controller 2110 may include one or more processing cores each configured to execute instructions. The controller 2110 may include one or more levels of caches, which may employ any size and any configuration (set associative, direct mapped, etc.). In some embodiments, the controller 2110 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, the controller 2110 may include one or more other components for processing, rendering, filtering, and encoding video and/or images as described herein, for example one or more of various types of integrated circuits (ICs), image signal processors (ISPs), encoder/decoders (codecs), etc. In some embodiments, the controller 2110 may include at least one system on a chip (SOC).

The base station memory 2120 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Base station 2100 may also include one or more wireless technology interfaces 2130 configured to communicate with device 2150 via a wireless connection 2180 to receive sensor inputs from the device 2150 and send compressed frames, slices, or tiles from the base station 2100 to the device 2150. In some embodiments, a wireless technology interface 2130 may implement a proprietary wireless communications technology that provides a highly directional wireless link between the device 2150 and the base station 2100. In some embodiments, the directionality and band width of the wireless communication technology may support multiple devices 2150 communicating with the base station 2100 at the same time to thus enable multiple users to use the system 2000 at the same time in a co-located environment. However, other commercial (e.g., Wi-Fi, Bluetooth, etc.) or proprietary wireless communications technologies may be used in some embodiments.

In some embodiments, the base station 2100 may be configured to render and transmit frames to the device 2150 to provide a 3D virtual view for the user based at least in part on sensor 2160 inputs received from the device 2150. In some embodiments, the virtual view may include renderings of the user's environment, including renderings of real objects in the user's environment, based on video captured by one or more scene cameras (e.g., RGB (visible light) video cameras) that capture high-quality, high-resolution video of the user's environment in real time for display. In some embodiments, the virtual view may also include virtual content (e.g., virtual objects, virtual tags for real objects, avatars of the user, etc.) rendered and composited with the projected 3D view of the user's real environment by the base station 2100.

While not shown in FIGS. 9 and 10, in some embodiments the VR/MR system 2000 may include one or more other components. For example, the system may include a cursor control device (e.g., mouse) for moving a virtual cursor in the 3D virtual view to interact with virtual content. While FIGS. 9 and 10 show a single device 2150, in some embodiments the VR/MR system 2000 may support multiple devices 2150 communicating with the base station 2100 at the same time to thus enable multiple users to use the system at the same time in a co-located environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A video encoding system, comprising:
   a block-based encoder;

a wavelet transform component comprising one or more processors configured to apply a wavelet transform to a plurality of pixel blocks from a slice of a current video frame to decompose the plurality of pixel blocks from the slice into a plurality of frequency bands;

a buffer configured to store frequency data for the plurality of frequency bands into frequency blocks; and a complexity analysis component comprising one or more processors configured to calculate complexity statistics across the plurality of frequency bands in the buffer of frequency blocks in reference to one another and output the complexity statistics to the block-based encoder;

wherein the block-based encoder is configured to:
  determine quantization parameters for each of the frequency bands in the plurality of frequency bands in the buffer of frequency blocks based at least in part on the complexity statistics; and
  apply an encoding technique to the buffered frequency blocks of the buffer, wherein the encoding technique uses the determined quantization parameters to compress the frequency data in the frequency blocks of the buffer; and a wireless interface configured to transmit the compressed frequency data for the slice over a wireless connection to a receiving device.

2. The video encoding system as recited in claim 1, wherein the complexity statistics include one or more of pixel gradient information or variance in sizes of the frequency blocks.

3. The video encoding system as recited in claim 1, wherein the block-based encoder is further configured to determine the quantization parameters for each of the frequency bands in the plurality of frequency bands in the buffer of frequency blocks based at least in part on the complexity statistics in combination with an actual number of bits that were used to encode a co-sited slice of a previously processed video frame.

4. The video encoding system as recited in claim 1,
wherein the wireless interface is configured to provide a current available bit rate for the wireless connection as feedback to the block-based encoder; and
wherein, when determining the quantization parameters for each of the frequency bands in the plurality of frequency bands in the buffer of frequency blocks, the encoder is configured to allocate the current available bit rate among the plurality of frequency bands.

5. The video encoding system as recited in claim 1,
wherein the wireless interface is configured to provide a current available bit rate for the wireless connection and a current dropped packet rate on the wireless connection as feedback to the block-based encoder;
wherein, when determining the quantization parameters for each of the frequency bands in the plurality of frequency bands in the buffer of frequency blocks, the block-based encoder is configured to adjust the quantization parameters for the plurality of frequency bands to minimize the dropped packet rate while maximizing available bandwidth usage at the current available bit rate.

6. The video encoding system as recited in claim 1, wherein the block-based encoder is further configured to determine the quantization parameters based at least in part on the complexity statistics in combination with complexity statistics from a previous frame and a foveated region of the previous frame.

7. The video encoding system as recited in claim 6, wherein, to determine the quantization parameters based at least in part on the complexity statistics in combination with the complexity statistics from the previous frame and the foveated region of the previous frame, the block-based encoder modulates the complexity statistics from the previous frame according to the foveated region of the previous frame and uses the modulated complexity statistics from the previous frame in combination with the complexity statistics for the slice to determine the quantization parameters.

8. The video encoding system as recited in claim 1, wherein the wavelet transform is a two-level wavelet decomposition applied to each pixel block from the video frame.

9. The video encoding system as recited in claim 1, wherein the block-based encoder includes:
  a block processing pipeline configured to apply the encoding technique to the frequency blocks of the buffer; and
  a rate control component configured to determine the quantization parameters for each of the frequency bands and provide the quantization parameters to the block processing pipeline.

10. A method, comprising:
one or more processors configured to implement:
  applying a wavelet transform to a plurality of pixel blocks from a slice of a current video frame to decompose the pixel blocks from the slice into a plurality of frequency bands;
  storing frequency data for the plurality of frequency bands into frequency blocks of a buffer;
  calculating complexity statistics across the plurality of frequency bands stored in the frequency blocks of the buffer in reference to one another;
  determining quantization parameters for each of the frequency bands in the plurality of frequency bands stored in the frequency blocks of the buffer based at least in part on the complexity statistics;
  applying an encoding technique to the frequency blocks of the buffer, wherein the encoding technique uses the determined quantization parameters to compress the frequency data in the frequency blocks of the buffer; and
  transmitting the compressed frequency data for the slice over a wireless connection to a receiving device.

11. The method as recited in claim 10, wherein the complexity statistics include one or more of pixel gradient information or variance in sizes of the frequency blocks.

12. The method as recited in claim 10, further comprising determining the quantization parameters for each of the frequency bands in the plurality of frequency bands stored in the frequency blocks of the buffer based at least in part on the complexity statistics in combination with an actual number of bits that were used to encode a co-sited slice of a previously processed video frame.

13. The method as recited in claim 10, further comprising tracking a current available bit rate for the wireless connection, wherein determining the quantization parameters includes allocating the current available bit rate among the plurality of frequency bands.

14. The method as recited in claim 10, further comprising tracking a current available bit rate for the wireless connection and a current dropped packet rate on the wireless connection, wherein determining the quantization parameters includes adjusting the quantization parameters for the plurality of frequency bands to minimize the dropped packet rate while maximizing available bandwidth usage at the current available bit rate.

15. The method as recited in claim 10, further comprising determining the quantization parameters based at least in part on the complexity statistics in combination with complexity statistics from a previous frame and a foveated region of the previous frame.

16. The method as recited in claim 15, wherein determining the quantization parameters based at least in part on the complexity statistics in combination with complexity statistics from the previous frame and the foveated region of the previous frame comprises modulating the complexity statistics from the previous frame according to the foveated region of the previous frame and using the modulated complexity statistics from the previous frame in combination with the complexity statistics to determine the quantization parameters.

17. A system, comprising:
a device comprising one or more processors and a display subsystem;
a base station comprising one or more processors configured to:
apply a wavelet transform to a plurality of pixel blocks from a slice of a current video frame to decompose the pixel blocks from the slice into a plurality of frequency bands;
store frequency data for the plurality of frequency bands into frequency blocks of a buffer;
calculate complexity statistics across the plurality of frequency bands stored in the frequency blocks of the buffer in reference to one another;
determine quantization parameters for each of the frequency bands in the plurality of frequency bands stored in the frequency blocks of the buffer based at least in part on the complexity statistics;
apply an encoding technique to the frequency blocks of the buffer, wherein the encoding technique uses the determined quantization parameters to compress the frequency data in the frequency blocks of the buffer; and
transmit the compressed frequency data for the slice over a wireless connection to the device;
wherein the one or more processors of the device are configured to:
decompress the compressed frequency data received from the base station;
perform wavelet synthesis on the decompressed frequency data bands to reconstruct pixel data for the video frame; and
provide the reconstructed pixel data to the display subsystem for display.

18. The system as recited in claim 17, wherein the one or more processors of the base station are configured to determine the quantization parameters for each of the frequency bands in the plurality of frequency bands in the buffer of frequency blocks based at least in part on the complexity statistics in combination with encoding information for a previously processed video frame.

19. The system as recited in claim 17, wherein the one or more processors of the base station are configured to adjust the quantization parameters for the plurality of frequency bands to minimize a dropped packet rate on the wireless connection while maximizing available bandwidth usage at a current available bit rate of the wireless connection.

20. The system as recited in claim 17, wherein the device is a head-mounted display (HMD).

* * * * *